United States Patent
Zong et al.

(10) Patent No.: US 11,159,933 B2
(45) Date of Patent: Oct. 26, 2021

(54) MOBILITY MANAGEMENT METHOD, APPARATUS, AND SYSTEM

(71) Applicant: HUAWEI TECHNOLOGIES CO., LTD., Guangdong (CN)

(72) Inventors: Zaifeng Zong, Nanjing (CN); Hao Jing, Mougins (FR); Fenqin Zhu, Shanghai (CN)

(73) Assignee: Huawei Technologies Co., Ltd., Shenzhen (CN)

(*) Notice: Subject to any disclaimer, the term of this patent is extended or adjusted under 35 U.S.C. 154(b) by 10 days.

(21) Appl. No.: 16/849,435

(22) Filed: Apr. 15, 2020

(65) Prior Publication Data
US 2020/0245127 A1   Jul. 30, 2020

Related U.S. Application Data

(63) Continuation of application No. PCT/CN2017/106397, filed on Oct. 16, 2017.

(51) Int. Cl.
*H04W 8/02*   (2009.01)
*H04W 76/12*   (2018.01)
*H04W 36/14*   (2009.01)
*H04W 36/00*   (2009.01)

(52) U.S. Cl.
CPC ......... *H04W 8/02* (2013.01); *H04W 36/0022* (2013.01); *H04W 36/14* (2013.01); *H04W 76/12* (2018.02); *H04W 36/0033* (2013.01)

(58) Field of Classification Search
CPC . H04W 36/0022; H04W 36/14; H04W 48/18; H04W 36/0033; H04W 36/00; H04W 36/0066
See application file for complete search history.

(56) References Cited

U.S. PATENT DOCUMENTS

| | | | |
|---|---|---|---|
| 2017/0164212 A1 | 6/2017 | Opsenica et al. | |
| 2017/0295489 A1 | 10/2017 | Agiwal et al. | |
| 2020/0359291 A1* | 11/2020 | Ramle | H04W 48/18 |
| 2020/0383151 A1* | 12/2020 | Wang | H04W 36/0022 |

FOREIGN PATENT DOCUMENTS

| | | |
|---|---|---|
| CN | 106060900 A | 10/2016 |
| CN | 107113195 A | 8/2017 |
| JP | 2013176042 A | 9/2013 |

(Continued)

OTHER PUBLICATIONS

Office Action issued in Chinese Application No. 201780095985.2 dated Dec. 11, 2020, 7 pages.

(Continued)

*Primary Examiner* — Nam T Huynh
(74) *Attorney, Agent, or Firm* — Fish & Richardson P.C.

(57) ABSTRACT

Embodiments of the present disclosure disclose a mobility management method, apparatus, and system, and pertain to the field of wireless communications technologies. The method includes: determining, by a first mobility management entity based on information about a Packet Data Network (PDN) connection established by user equipment in a 4G network, a network slice corresponding to the PDN connection, and then determining, with reference to a subscribed network slice of the user equipment, a network slice allowed for the user equipment.

20 Claims, 10 Drawing Sheets

(56) References Cited

FOREIGN PATENT DOCUMENTS

JP  2015528675 A  9/2015
RU  2435331 C2  11/2011

OTHER PUBLICATIONS

Office Action issued in Russian Application No. 2020115892/07(026061) dated Nov. 23, 2020, 220 pages, 9 pages (English translation).
3GPP TS 23.502 V1.2.0 (Sep. 2017),3rd Generation Partnership Project, Technical Specification Group Services and System Aspects, Procedures for the 5G System, Stage 2(Release 15),165 pages.
Catt, "The information for servicing node selection in eDECOR",SA WG2 Meeting #116bis, S2-165236,Sanya, China, Aug. 29-Sep. 2, 2016, 4 pages.
3GPP TS 23.501 V1.4.0 (Sep. 2017),3rd Generation Partnership Project, Technical Specification Group Services and System Aspects, System Architecture for the 5G System, Stage 2(Release 15), 151 pages.
PCT International Search Report and Written Opinion in International Application No. PCT/CN2017/106,397, dated Jun. 29, 2018, 15 pages (With English Translation).
3GPP TR 29.891 V1.0.0 (Sep. 2017), "3rd Generation Partnership Project; Technical Specification Group Core Network and Terminals; 5G System-Phase 1; CT WG4 Aspects (Release 15)," Sep. 2017, 132 pages.
Extended European Search Report issued in European Application No. 17929155.4 dated Oct. 23, 2020, 17 pages.
Huawei, HiSilicon, "TS 23.502 SMF information context synchronization between old AMF and new AMF," SA WG2 Meeting #122B, S2-175643, Sophia Antipolis, France, Aug. 21-25, 2017, 17 pages.
NTT Docomo et al., "TS 23.501:Network slicing interworking with eDecor," SA WG2 Meeting #122bis, S2-176639, Sophia Antipolis, France, Aug. 21-25, 2017, 3 pages.
Qualcomm Incorporated, "TS 23.501—Interworking between 5GC slicing mechanisms and eDecor," SA WG2 Meeting #122bis, S2-175769, Sophia Antipolis, France, Aug. 21-25, 2017, 3 pages.
ZTE, "Selection RAN Part Network Slice during UE mobility," 3GPP TSG RAN WG3 NR-adhoc, R3-170065, Spokane, USA, Jan. 17-19, 2017, 7 pages.
Ericsson, "Network slicing and Interworking with EPS," 3GPP TSG SA WG2 #125, S2-180108, Gothenburg, Sweden, Jan. 22-26, 2018, 19 pages.
Ericsson, "Network slicing and Interworking with EPS," 3GPP TSG SA WG2 #124, S2-178555, Nov. 27-Dec. 1, 2017, 15 pages.
Huawei, "Pseudo-CR on Network Slice Selection Function Procedures and Services," 3GPP TSG CT WG4 #80, C4-175145, Oct. 23-27, 2017, 8 pages.
Office Action issued in Japanese Application No. 2020-521458 dated May 25, 2021, 8 pages (with English translation).

* cited by examiner

MOBILITY MANAGEMENT METHOD, APPARATUS, AND SYSTEM

CROSS-REFERENCE TO RELATED APPLICATIONS

This application is a continuation of International Application No. PCT/CN2017/106397, filed on Oct. 16, 2017, the disclosure of which is hereby incorporated by reference in its entirety.

TECHNICAL FIELD

Embodiments of the present invention relate to the field of wireless communications technologies, and in particular, to a mobility management method, apparatus, and system.

BACKGROUND

With rapid development of wireless communications technologies, the 5th generation (5G) mobile communications technology emerges. At an early stage of network deployment, coverage of a 5G network is insufficient. Therefore, when a location of user equipment (UE) changes, the UE may be handed over between a 5G network and a 4th generation (4G) network to ensure that a user can enjoy an equivalent service.

A DCN (dedicated core network) is a dedicated core network that is defined in 4G by the 3rd Generation Partnership Project (3GPP) and that is used to serve a specific type of service. The DCN includes one or more mobility management entities (MME) and one or more serving gateways (SGW)/PDN gateways (PGW)/policy and charging rules functions (PCRF). Another core-network network element such as a home subscriber server (HSS) is shared by all DCNs. Operators may deploy a DCN to isolate a specific user (for example, a subscriber belonging to a specific enterprise or a separate administrative domain), or to tailor network functions for a specific service attribute (for example, a low-latency high-reliability type). In 4G, a network selects a DCN for UE based on a user equipment usage type (UE Usage Type). After the UE accesses a DCN, an MME serving the DCN sends a DCN identifier (DCN ID) to the UE. The UE adds the DCN ID to an RRC message when accessing the DCN next time, and a base station can quickly find, based on the DCN ID, the MME of the DCN that the UE needs to access.

A concept of network slicing is introduced in 5G; and network slicing is an upgraded version of the DCN. The 5G network slicing is essentially different from a 4G DCN in terms of architectures. In the 4G DCN, a DCN is a dedicated network, and there is no association between DCNs. In 5G; a plurality of network slices may share a group of access and mobility management functions (AMF), each network slice has a slice-specific session management function SMF), user plane function (UPF), and policy control function (PCF), and unified data management (UDM) is shared among all slices.

After 5G is introduced, network interworking between 5G and 4G exists. However, in the prior art, mapping between a DCN and a network slice is not considered for interworking between 4G and 5G For example, when user equipment moves from a coverage area of a 4G base station to a coverage area of a 5G base station, the prior art provides no corresponding solution for how to ensure that the user equipment can still enjoy a subscribed service equivalent to an original subscribed service. In addition, when the user moves in the 5G network, and when an AMF currently serving the UE cannot continue to provide a service for the UE, the prior art provides no corresponding solution for how to ensure that the user equipment can access a corresponding network slice by using another AMF.

SUMMARY

Embodiments of the present invention provide a mobility management method, apparatus, and system, to resolve a problem of how to access a corresponding network slice when a location of user equipment changes.

To achieve the foregoing objectives, the embodiments of the present invention provide the following technical solutions:

According to a first aspect, a mobility management method is provided, and the method includes: obtaining, by a first mobility management entity, information about an established PDN connection and information about a subscribed network slice of user equipment UE; and obtaining, by the first mobility management entity based on the information about the established PDN connection and the information about the subscribed network slice, information about a network slice allowed for the UE. The information about the established PDN connection may be specifically an identifier of a session management function entity corresponding to the PDN connection or an access point name APN corresponding to the PDN connection. Based on the information about the established PDN connection, the first mobility management entity can obtain information about a network slice corresponding to the established PDN connection; and further, based on the information about the subscribed network slice of the UE, the first mobility management entity can determine PDN connections that can be handed over, network slices to which the PDN connections of the UE can be handed over in a 5G network, and the information about the allowed network slice. Therefore, it is ensured that when moving from a 4G coverage area in which the user equipment enjoys a DCN service in a 4G network to a coverage area of a 5G base station, the user equipment can be handed over to a proper network slice, and can still enjoy a network service equivalent to that in the original 4G network. In particular, the user equipment can be handed over to a network slice instance corresponding to the PDN connection in the 4G network, so that service continuity can be ensured while the user equipment can enjoy a network service equivalent to that in the original 4G network.

The obtaining, by the first mobility management entity based on the information about the established PDN connection and the information about the subscribed network slice, information about a network slice allowed for the UE can be specifically implemented in the following several possible manners:

In a possible implementation, the first mobility management entity obtains, based on the information about the established PDN connection, information about a network slice corresponding to the established PDN connection; and the first mobility management entity obtains, based on the information about the network slice corresponding to the established PDN connection and the information about the subscribed network slice, the information about the network slice allowed for the UE. The obtained information about the network slice allowed for the UE can be specifically determined by the first mobility management entity itself based on the information about the network slice corresponding to the established PDN connection and the information about the subscribed network slice, or the first mobility managementment entity may request a network slice selection function entity to determine the obtained information about the network slice allowed for the UE. For example, the first mobility management entity sends a slice selection request to the network slice selection function entity, where the slice selection request includes the information about the network slice corresponding to the established PDN connection and the information about the subscribed network slice; and the first mobility management entity receives a slice selection response returned by the network slice selection function entity, where the slice selection response includes the information about the network slice allowed for the UE. That the first mobility management entity obtains, based on the information about the established PDN connection, information about the network slice corresponding to the established PDN connection may be specifically: obtaining, by the first mobility management entity, the information about the network slice corresponding to the established PDN connection from a session management function entity corresponding to the established PDN connection.

When the information about the established PDN connection is an FQDN of a PGW-C/SMF, and the FQDN includes information about a network slice, the first mobility management entity or the network slice selection function entity may determine, based on the FQDN, the information about the network slice corresponding to the PDN connection. When the information about the established PDN connection is an IP address of the PGW-C/SMF, the first mobility management entity or the network slice selection function entity may reversely query a domain name system (DNS) based on the IP address, to obtain the FQDN of the PGW-C/SMF, and further obtain, according to the foregoing method, the information about the network slice corresponding to the PDN connection. When the information about the established PDN connection is an APN, the first mobility management entity or the network slice selection function entity determines, based on a preconfigured mapping relationship between an APN and S-NSSAI, the information about the network slice corresponding to the PDN connection.

In a possible implementation, the first mobility management entity may request the network slice selection function entity to determine the information about the network slice allowed for the UE. The obtaining, based on the information about the established PDN connection and the information about the subscribed network slice, information about a network slice allowed for the UE is specifically: sending, by the first mobility management entity, a slice selection request to the network slice selection function entity, where the slice selection request includes the information about the established PDN connection and the information about the subscribed network slice; and receiving, by the first mobility management entity, a slice selection response returned by the network slice selection function entity, where the slice selection response includes the information about the network slice allowed for the UE.

In another possible implementation, before the obtaining, by a first mobility management entity, information about an established PDN connection of user equipment UE, the method further includes: receiving, by the first mobility management entity, a first request message from a network device, where the first request message carries the information about the established PDN connection, and the first mobility management entity is determined by the network device based on information about a target access region of the UE and one of the following parameters: an identifier of a dedicated core network accessed by the UE or a globally unique temporary identifier GUTI of the UE, where the GUTI includes information about a mobility management entity serving the UE. The first request message may be a handover request in step 303 in the embodiment of FIG. 3 or in step 403 in the embodiment of FIG. 4, and the network device may be a mobility management entity MME providing an access service for the UE before a handover.

Because a location of the UE changes, a mobility management entity currently serving the UE may not hand over all PDN connections of the UE to proper network slices in the 5G network. For a PDN connection that cannot be handed over in established PDN connections of the UE in the 4G network, the first mobility management entity sends a PDN connection handover reject message to a third mobility management entity, where the PDN connection handover reject message includes information about the PDN connection that cannot be handed over. The third mobility management entity releases the PDN connection that cannot be handed over, and the third mobility management entity may be an MME in the 4G network.

According to a second aspect, a mobility management method is provided, and the method includes: obtaining, by a network device, a globally unique temporary identifier GUTI of user equipment UE, where the GUTI includes information about a mobility management entity serving the UE; and obtaining, by the network device based on the information about the mobility management entity serving the UE and information about a target access region, a mobility management entity that is to perform a mobility handover. Specifically, a mapping relationship may be configured in the network device, and the network device queries the mapping relationship based on the information about the mobility management entity serving the UE and the information about the target access region, to determine the mobility management entity that is to perform a mobility handover. Alternatively, the mapping relationship may be stored on another device in the network, and the network device may send a query request to the another device, to obtain the mobility management entity that is to perform a mobility handover. When a location of the UE changes, the mobility management entity that is to perform a mobility handover can be quickly determined according to the method provided in this embodiment.

In a possible implementation, the information about the mobility management entity serving the UE is information about an AMF, and the information about the AMF includes information about a region in which an AMF serving the UE is located and information about a set to which the AMF serving the UE belongs; and the determining, by the network device based on the information about the mobility management entity serving the UE and information about a target access region, a mobility management entity that is to perform a mobility handover is specifically: determining, by the network device based on the information about the region in which the AMF serving the UE is located, the information about the set to which the AMF serving the UE belongs, and the information about the target access region, the mobility management entity that is to perform a mobility handover. According to the method provided in this embodiment, during a handover of the UE from a 5G network to a 4G network or when the UE moves within the 5G network, the mobility management entity that is to perform a mobility handover can be quickly determined.

In a possible implementation, the information about the mobility management entity serving the UE is an identifier of the MME, and the identifier of the MME includes an identifier of an MME group to which the MME belongs and a code number of the MME; and the determining, by the network device based on the information about the mobility management entity serving the UE and information about a target access region, a mobility management entity that is to perform a mobility handover is specifically: determining, by the network device based on the identifier of the MME and the information about the target access region, the mobility management entity that is to perform a mobility handover. The determining, by the network device based on the identifier of the MME and the information about the target access region, the mobility management entity that is to perform a mobility handover may be implemented in two possible manners: In one implementation, the network device queries, based on the identifier of the MME and the information about the target access region, the mapping relationship stored locally or on another device, to determine the mobility management entity that is to perform a mobility handover. In the other implementation, the network device determines an initial AMF region identifier based on the identifier of the MME group in the identifier of the MME; and obtains an initial AMF set identifier based on the code number of the MME; or determines an initial AMF region identifier and an initial AMF set identifier based on the identifier of the MME group in the identifier of the MME. When a region corresponding to the information about the target access region is in a region indicated by the initial AMF region identifier, the network device selects, from an AMF set indicated by the initial AMF set identifier, one AMF as the mobility management entity that is to perform a mobility handover. When a region corresponding to the information about the target access region is not in a region indicated by the initial AMF region identifier, the network device obtains a corresponding target AMF set based on the initial AMF region identifier, the initial AMF set identifier, and the information about the target access region, and selects one AMF from the target AMF set as the mobility management entity that is to perform a mobility handover. According to the method provided in this embodiment, when the UE moves from the 4G network to the 5G network, the mobility management entity that is to perform a mobility handover can be quickly determined.

The network device may be a base station, or may be a mobility management entity in the 4G network or 5G network.

According to a third aspect, a mobility management apparatus is provided, and the mobility management apparatus has functions of implementing the method according to the first and/or the second aspect. The functions may be implemented by hardware, or may be implemented by hardware executing corresponding software. The hardware or software includes one or more modules corresponding to the functions.

According to a fourth aspect, a mobility management apparatus is provided, including: a processor and a memory. The memory is configured to store a computer executable instruction, and when the mobility management apparatus runs, the processor executes the computer executable instruction stored in the memory, so that the mobility management apparatus performs the mobility management method according to either of the first aspect and the second aspect.

According to a fifth aspect, a computer readable storage medium is provided, where the computer readable storage medium stores an instruction, and when the instruction is run on a computer, the computer may perform the mobility management method according to any possible implementation of the first aspect.

According to a sixth aspect, a computer program product including an instruction is provided, where when the computer program product is run on a computer, the computer may perform the mobility management method according to either of the first aspect and the second aspect.

According to a seventh aspect, a chip system is provided, and the chip system includes a processor, configured to support a mobility management apparatus in implementing the functions in the foregoing aspects. In a possible design, the chip system further includes a memory, and the memory is configured to store a program instruction and data that are necessary for the mobility management apparatus. The chip system may include a chip, or may include a chip and another discrete device.

For technical effects brought by any design manner in the third aspect to the seventh aspect, refer to the technical effects brought by different design manners in the first aspect and second aspect. Details are not described herein again.

DESCRIPTION OF EMBODIMENTS

To make the objectives, technical solutions, and advantages of the present invention clearer, the following further describes the embodiments of the present invention with reference to the accompanying drawings. Apparently, the described embodiments are merely some rather than all of the embodiments of the present invention. A specific operation method in a method embodiment may also be applied to an apparatus embodiment or a system embodiment.

A network architecture and a service scenario are described in the embodiments of the present invention to describe the technical solutions in the embodiments of the present invention more clearly, but do not constitute a limitation on the technical solutions provided in the embodiments of the present invention. A person of ordinary skill in the art may understand that, as the network architecture evolves and a new service scenario emerges, the technical solutions provided in the embodiments of the present invention are also applicable to a similar technical problem.

Figure 1:
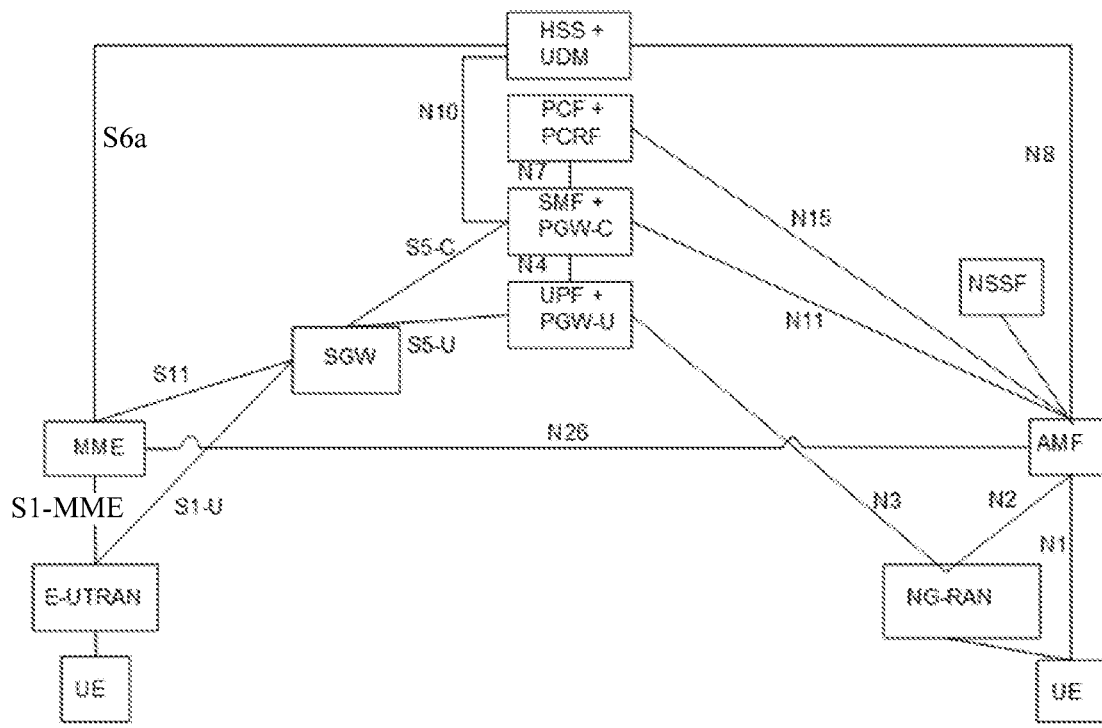
FIG. 1 is a schematic diagram of an architecture of a mobility management system according to an embodiment of this application.

A mobility management method provided in the embodiments of the present invention can be applied in a system 100 shown in FIG. 1. In the system 100, an evolved universal terrestrial radio access network (E-UTRAN) includes at least a 4G base station (for example, an e-NodeB), and a next-generation radio access network (NG-RAN) includes at least a 5G base station. User equipment UE in this application may include various handheld devices, in-vehicle devices, wearable devices, and computing devices that have a wireless communication function, or other processing devices connected to a wireless modem, and user equipment (UE), terminals (terminal), terminal equipment (Terminal Equipment), software terminals, and the like that are in various forms. For ease of description, in this application, the devices mentioned above are collectively referred to as user equipment or UE. In an architecture of interworking between 4G and 5G shown in FIG. 1, a 4G network and a 5G network share UPF+PGW-U, SMF+PGW-C, PCF+PCRF, or UDM+HSS. "+" herein represents co-location of a related network function entity in 5G and a network element in 4G. For example, the UPF is a user plane function in 5G, the PGW-U is a gateway user plane function in 4G corresponding to the UPF, and UPF+PGW-U is briefly referred to as a user plane function entity in the embodiments of the present invention; the SMF is a session management function in 5G, the PGW-C is a gateway control plane function in 4G corresponding to the SMF, and the SMF+PGW-C is briefly referred to as a session management function entity; the PCF is a policy control function in 5G, the PCRF is a corresponding policy and charging rules function in 4G; and the PCF+PCRF is briefly referred to as a policy control function entity; the UDM is unified data management in 5G; the HSS is a home subscriber server in 4G; and the HSS+UDM is briefly referred to as a user data management entity. In the interworking architecture, an MME and an AMF interwork with each other through an N26 interface, and the interface is used for transfer of a context of the UE and a handover process. In addition, the base station in the 4G network is connected through an SGW to the PGW-C/U. For related interfaces in the figure, refer to the prior art. Details are not described in the embodiments of the present invention.

In addition, a network slice selection function (NSSF) entity in FIG. 1 is configured to select a network slice. When the AMF cannot select a network slice for the UE, the AMF requests the NSSF to select a network slice for the UE.

When the UE moves from an E-UTRAN coverage area to an NG-RAN coverage area, or from an NG-RAN coverage area to an E-UTRAN coverage area, or when the AMF currently serving the UE cannot continue to provide a service for the UE because the UE moves, the mobility management method provided in the embodiments of the present invention is triggered.

During a handover of the user equipment from the 4G network to the 5G network, to ensure service continuity of the user equipment, a PDN connection of the user equipment in the 4G network needs to be mapped to a PDU session in a corresponding network slice instance in 5G Because the MME possibly fails to select a network slice, when the user equipment needs to be handed over from a PDN connection in the 4G network to a PDU session in a 5G core network, the MME possibly fails to select a proper AMF for the user equipment. In a possible implementation, the MME selects a default AMF. After receiving a handover request sent by the MME, the default AMF may request the NSSF to allocate a target AMF to the user equipment. In another possible implementation, a mapping relationship between a DCN identifier and an AMF set is configured in the MME, and the MME determines a target AMF based on a DCN identifier corresponding to the user equipment. It is considered that after the user equipment is handed over to 5G, a new PDU session is further created subsequently. Therefore, a 5G core network further needs to determine information about a network slice allowed for the user equipment (Allowed NSSAI).

Specifically, the 5G core network first determines, based on information about an established PDN connection of the user equipment in the 4G network, a network slice corresponding to the PDN connection, and then determines, with reference to a subscribed network slice of the user equipment and a location of the user equipment, PDN connections that can be handed over to the 5G core network and network slices allowed for the user equipment.

In addition, during a handover of the user equipment from the 5G network to the 4G network, the 5G core network (AMF) obtains a user equipment usage type (UE usage type) from the user data management entity, and selects a target MME based on the UE usage type. Because not all PDU sessions can be handed over to the 4G network, some PDU sessions may need to be discarded in the handover process.

Figure 2:
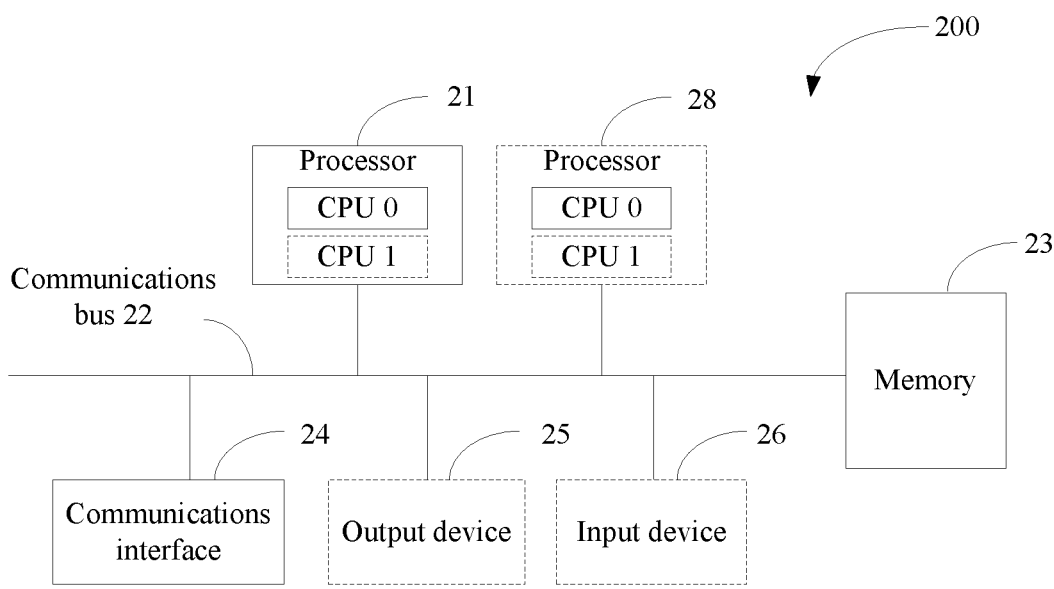
FIG. 2 is a schematic diagram of a hardware structure of a mobility management apparatus according to an embodiment of this application.

As shown in FIG. 2, a node shown in FIG. 1, such as the MME, the AMF, the E-UTRAN, or the NG-RAN may be implemented in a form of a computer device (or system) in FIG. 2.

FIG. 2 is a schematic diagram of a computer device 200 according to an embodiment of the present invention. The computer device 200 includes at least one processor 21, a communications bus 22, a memory 23, and at least one communications interface 24.

The processor 21 may be a general-purpose central processing unit (CPU), a microprocessor, an application-specific integrated circuit (ASIC), or one or more integrated circuits configured to control program execution of the solutions of the present invention.

The communications bus 22 may include a path, through which information is transferred between the foregoing components. The communications interface 24 uses any apparatus such as a transceiver to communicate with another device or another communications network, such as an Ethernet, a radio access network (RAN), or a wireless local area network (WLAN).

The memory 23 may be but is not limited to: a read-only memory ( ) or another type of static storage device capable of storing static information and instructions, a random access memory (RAM) or another type of dynamic storage device capable of storing information and instructions, an electrically erasable programmable read-only memory (EEPROM), a compact disc read-only memory (CD-ROM) or another compact disc storage, an optical disc storage (including a compact disc, a laser disc, an optical disc, a digital versatile disc, a Blu-ray disc, or the like), a magnetic disk storage medium or another magnetic storage device, or any other medium that can be used to carry or store expected program code in an instruction or data structure form and that can be accessed by a computer. The memory may exist independently, and is connected to the processor by using a bus. Alternatively, the memory may be integrated with the processor.

The memory 23 is configured to store application program code used to execute the solutions of the present invention, and the execution is controlled by the processor 21. The processor 21 is configured to execute the application program code stored in the memory 23.

During specific implementation, in an embodiment, the processor 21 may include one or more CPUs, for example, a CPU 0 and a CPU 1 in FIG. 2.

During specific implementation, in an embodiment, the computer device 200 may include a plurality of processors, for example, the processor 21 and a processor 28 in FIG. 2. Each of these processors may be a single-core (single-CPU) processor, or may be a multi-core (multi-CPU) processor. The processor herein may be one or more devices, circuits, and/or processing cores configured to process data (for example, a computer program instruction).

During specific implementation, in an embodiment, the computer device 200 may further include an output device 25 and an input device 26. The output device 25 communicates with the processor 21, and may display information in a plurality of manners. For example, the output device 25 may be a liquid crystal display (LCD), a light emitting diode (LED) display device, a cathode ray tube (CRT) display device, a projector (projector), or the like. The input device 26 communicates with the processor 21, and may receive an input of a user in a plurality of manners. For example, the input device 26 may be a mouse, a keyboard, a touchscreen device, a sensor device, or the like.

The foregoing computer device 200 may be a general-purpose computer device or a dedicated computer device. During specific implementation, the computer device 200 may be a desktop computer, a portable computer, a network server, a personal digital assistant (PDA), a mobile phone, a tablet computer, a wireless terminal device, a communications device, a built-in device, or a device having a structure similar to that in FIG. 2. The embodiments of the present invention impose no limitation on a type of the computer device 200.

For example, a node in FIG. 1, such as the MME, the AMF, the E-UTRAN, or the NG-RAN may be a device shown in FIG. 2. One or more software modules are stored in a memory of the MME. The software module may be implemented for the MME by using the processor and the program code in the memory, to implement the mobility management method.

The following describes the mobility management method provided in this embodiment of the present invention with reference to the flowcharts.

Figure 3:
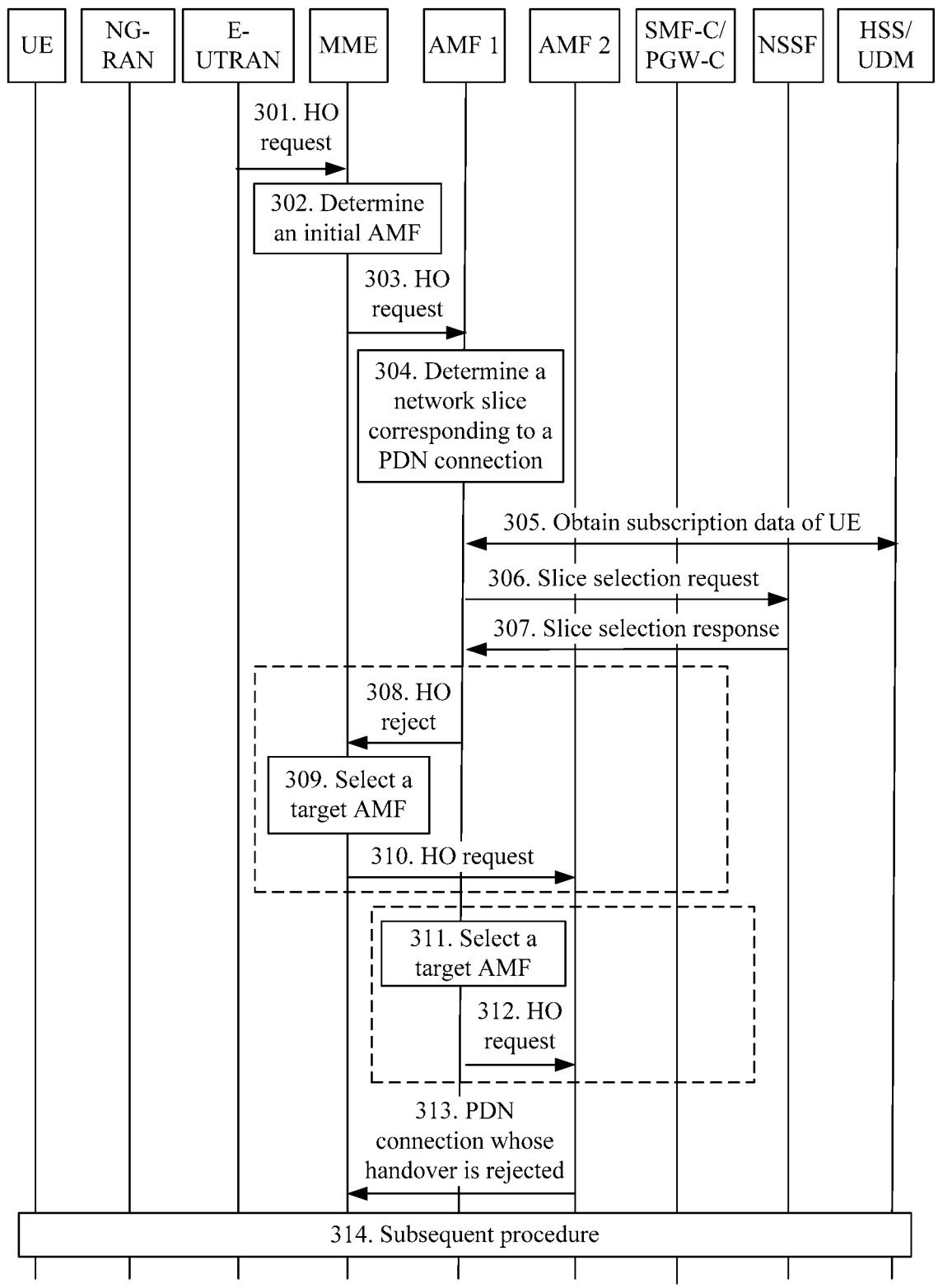
FIG. 3 is a schematic flowchart of a mobility management method according to an embodiment of this application.

FIG. 3 is a schematic flowchart of a mobility management method. In this embodiment, UE currently has accessed a 4G network by using a source base station (a base station in the 4G network, for example, an E-UTRAN), and the UE is in a connected state. When the source base station finds that the UE needs to be handed over, the source base station selects a target base station. In this embodiment, the target base station selected by the source base station is a base station connected to a 5G core network (for example, an NG-RAN). The source base station sends a handover request to an MME that provides a DCN service for the user equipment in the 4G network, to initiate a handover procedure.

Step 301: The source base station sends a first request message to the MME, where the first request message includes information about a target access region. The MME receives the first request message.

Specifically, the first request message may be a handover request (Handover Request), and the first request message may be sent by the source base station to the MME after a decision is made based on cell measurement information reported by the user equipment. Optionally, the first request message further includes information that can be used to determine the user equipment, for example, an identifier of the UE. The information about the target access region may include at least one of an identifier of a target cell, an identifier of the target base station, and an identifier of a target tracking area. The identifier of the target cell is used to uniquely identify a target cell, and the target cell is a cell to be accessed by the UE. The identifier of the target base station is used to uniquely identify a target base station, and the target base station is a base station to which the to-be-accessed cell belongs. The identifier of the target tracking area is used to uniquely identify a target tracking area, and the target tracking area is a tracking area in which the to-be-accessed cell is located.

Step 302: The MME determines an initial AMF.

Specifically, the MME may determine, based on the information about the target access region, whether the handover request is for a handover between different networks. For example, when the information about the target access region includes the identifier of the target base station, the MME may determine a type of the target base station based on the identifier of the target base station, and determine, based on the type, whether the first request message is for a handover between different networks. In a scenario in this embodiment of the present invention, the target base station is a base station in a 5G network. Therefore, the MME determines that the first request message is for an inter-system handover. To implement the inter-system handover, the MME needs to determine, based on the information about the target access region carried in the first request message, an AMF that is to perform a handover operation.

In a possible implementation, a mapping relationship between the MME and an AMF set is configured in the MME. The mapping relationship between the MME and the AMF set records a correspondence between a DCN ID, a target region, and a corresponding AMF set, or a correspondence between an identifier of the MME, the target region, and the corresponding AMF set, as shown in the following table.

TABLE 1

| DCN-ID or identifier of the MME | Target region | AMF set |
|---|---|---|
| A | Y | B |
| A | X | C |

The identifier of the MME includes an MME group identifier (MMEGI) and an MME code number (MME Code). After receiving the first request message sent by the source base station, the MME obtains a context of the UE based on the identifier of the UE carried in the first request message. The context includes an identifier of a dedicated core network accessed by the UE, or an identifier of a mobility management entity serving the UE. The MME determines a corresponding target region based on the information about the target access region, further determines a corresponding AMF set with reference to the mapping relationship and the identifier of the dedicated core network accessed by the UE or the identifier of the mobility management entity serving the UE, and selects, according to a corresponding policy, one AMF from the determined AMF set as the initial AMF. The policy may be specifically a method for determining one AMF from the AMF set based on information such as priorities, capacities, load, or the like of AMFs in the AMF set.

In another possible implementation, the MME group identifier (MMEGI) and the MME code number (MME Code) are carried in a globally unique temporary identifier (GUTI) of the UE. When receiving the first request message sent by the source base station, the MME obtains a context of the UE, where the context includes the GUTI of the UE, and the MME can directly determine an AMF set based on the GUTI of the UE and a mapping rule. According to the mapping rule, the MMEGI in the GUTI of the UE is specifically mapped to an AMF region identifier (AMF Region ID), and the MME code number (MME Code) is mapped to an AMF set identifier (AMF Set ID). The MME determines a target AMF set and an AMF based on the mapped AMF region ID and AMF set ID and the information about the target access region. If the information about the target access region is in an AMF region corresponding to the mapped AMF region ID, an AMF in an AMF set corresponding to the mapped AMF region ID and AMF set ID is selected as the initial AMF; otherwise, the target AMF set and the AMF are selected based on the mapped AMF region ID and AMF set ID and the information about the target access region. To support the foregoing selection, the following table is configured for a system:

TABLE 2

| Source AMF region | Source AMF set | Target region | Target AMF set |
|---|---|---|---|
| X | A | Y | B |
| ... | ... | ... | ... |

For example, the MME determines, according to the mapping rule, that the AMF region is X, the AMF set is A, and a target region Y corresponding to the information about the target access region is not in X. The MME determines, according to the foregoing configuration table for the system, that a proper AMF set is B, and selects one AMF from B as the initial AMF according to a preset policy.

According to the method for determining an initial AMF, the MME can determine the initial AMF by the MME itself, or may determine the initial AMF by querying another device in a network, for example, a domain name system (DNS). When the MME determines the initial AMF by querying the DNS, the foregoing Table 1 and Table 2 are configured in the DNS. The MME sends related information to the DNS and the DNS returns a selected initial AMF to the MME.

Step 303: The MME sends a second request message to the determined initial AMF (namely, an AMF 1 in FIG. 3), where the second request message carries information about an established PDN connection. The AMF 1 receives the second request message sent by the MME.

Specifically, the second request message may be a handover request. The information about the established PDN connection includes information about a PGW-C/SMF corresponding to the PDN connection, for example, may include an Internet Protocol address (IP address) or a fully qualified domain name (FQDN) of the PGW-C/SMF. Optionally, the information about the PDN connection may alternatively be an access point name (APN) corresponding to the PDN connection.

Step 304: After receiving the second request message sent by the MME, the AMF 1 obtains, based on the information about the established PDN connection carried in the second request message, information about a network slice corresponding to the established PDN connection.

It should be noted that, the user equipment may previously establish a plurality of PDN connections in the 4G network. Therefore, the information about the established PDN connection herein may indicate a plurality of PDN connections, and information about a network slice corresponding to each PDN connection can be determined in this step.

Specifically, in a possible implementation, when the information about the established PDN connection is the FQDN of the PGW-C/SMF, and the FQDN includes information about a network slice, the information about the network slice corresponding to the PDN connection, such as single network slice selection assistance information (S-NSSAI) and an identifier of a network slice instance (NSI), can be determined based on the FQDN. When the information about the established PDN connection is the IP address of the PGW-C/SMF, the AMF 1 can reversely query the domain name system (DNS) based on the IP address, to obtain the FQDN of the PGW-C/SMF, and further obtain, according to the foregoing method, the information about the network slice corresponding to the PDN connection.

In another possible implementation, when the information about the established PDN connection is the APN, a mapping relationship between an APN and S-NSSAI needs to be preconfigured in the AMF 1. When receiving the second handover request, the AMF 1 determines, based on the mapping relationship and the APN carried in the second handover request, S-NSSAI corresponding to the PDN connection. It should be noted that there is a constraint on this implementation. To be specific, the AMF 1 can accurately determine, based on the APN only when the S-NSSAI corresponding to the PDN connection corresponds to only one network slice instance, a network slice instance corresponding to the PDN connection, to ensure service continuity when the UE is handed over from a PDN connection in the 4G network to a PDU session in the 5G network subsequently. When the S-NSSAI corresponding to the PDN connection corresponds to a plurality of network slice instances, during a handover of the UE from a PDN connection in the 4G network to a PDU session in the 5G network according to the method, a similar network service may be provided for the UE but a short-time service interruption may occur because the UE may access another network slice instance that corresponds to the S-NSSAI corresponding to the PDN connection.

In another possible implementation, when the information about the established PDN connection is an identifier (the FQDN or the IP address) of the PGW-C/SMF, the AMF 1 sends, to the PGW-C/SMF based on the identifier of the PGW-C/SMF, a request for obtaining the network slice corresponding to the PDN connection. The PGW-C/SMF determines information about a network slice to which the PGW-C/SMF belongs, and returns a response message to the AMF 1, where the response message carries the information about the network slice corresponding to the PDN connection.

Step 305: The AMF 1 obtains subscription data of the UE from a user data management entity (HSS/UDM).

Specifically, because subscription data related to a network slice in 5G is different from that in 4G; a subscribed network slice of the UE in 5G cannot be mapped directly by the UE usage type. Therefore, the AMF 1 needs to obtain information about the subscribed network slice of the UE from the user data management entity, including subscribed S-NSSAI. Optionally, the information about the subscribed network slice further includes information such as a DNN corresponding to the subscribed S-NSSAI.

It should be noted that, step 304 and step 305 may be interchanged, or may be performed simultaneously. This embodiment of the present invention imposes no limitation on the order of 304 and 305.

Step 306: The AMF 1 sends a slice selection request to a network slice selection function (NSSF). The NSSF receives the slice selection request sent by the AMF 1.

It should be noted that a solution in which the AMF 1 determines, based on the information about the PDN connection, the network slice corresponding to the PDN connection is provided in step 304 in this embodiment of the present invention. In practice, the determining, based on the information about the PDN connection, the network slice corresponding to the PDN connection can also be implemented by the NSSF.

Specifically, when the AMF 1 can determine, based on the information about the PDN connection, the network slice corresponding to the PDN connection, that is, after step 304 is performed, the slice selection request includes the information about the network slice corresponding to the established PDN connection (for example, corresponding S-NSSAI, and an identifier of an optional network slice instance), the information (for example, subscribed S-NSSAI) about the subscribed network slice of the UE, and the like.

When the AMF 1 cannot determine, based on the information about the PDN connection, the network slice corresponding to the PDN connection, that is, step 304 is not performed in this embodiment of the present invention, the AMF 1 needs to send the information about the established PDN connection to the NSSF. Specifically, the slice selection request includes the information about the established PDN connection, the information about the subscribed network slice of the UE, and the like. The method for determining, by the NSSF based on the information about the PDN connection, the network slice corresponding to the PDN connection is the same as the method for determining, by the AMF 1, the network slice corresponding to the PDN connection. Details are not described herein again.

Step 307: The NSSF returns a slice selection response to the AMF 1, where the slice selection response includes information about a network slice allowed for the UE (Allowed NSSAI) and information about a target AMF set. The AMF 1 receives the slice selection response sent by the NSSF.

Specifically, the NSSF determines, based on the information about the network slice corresponding to the established PDN connection, the information about the subscribed network slice of the UE, and the like, the target AMF set providing access for the UE and the allowed NSSAI. The NSSF sends the target AMF set and the information about the network slice allowed for the UE allowed NSSAI to the initial AMF.

Optionally, the NSSF may get intersection of the network slice corresponding to the established PDN connection of the UE and the subscribed network slice of the UE, to determine the network slice allowed for the UE and the corresponding target AMF set; or get a union of the subscribed network slice of the UE and the network slice corresponding to the established PDN connection of the UE, to determine the network slice allowed for the UE and the corresponding target AMF set. This embodiment of the present invention imposes no limitation on the method for determining, by the NSSF based on the network slice corresponding to the established PDN connection (including the S-NSSAI and the identifier of the NSI) and the information about the subscribed network slice of the UE, the network slice allowed for the UE.

The AMF 1 receives the slice selection response returned by the NSSF. When the AMF 1 determines, based on the target AMF set, that the AMF 1 can provide a service for the selected network slice, a subsequent handover procedure (namely, step 314) is directly performed. When the AMF 1 determines, based on the target AMF set, that the AMF 1 cannot provide a service for the selected network slice, the following steps 308 to 310 may be performed, that is, the MME selects one target AMF from the target AMF set for the UE; or steps 311 and 312 may be performed, that is, the AMF 1 selects one target AMF from the target AMF set for the UE, and sends a handover request to the target AMF.

It should be noted that, when the initial AMF determined in step 302 is accurate, the initial AMF can always provide a service for the UE. In this case, the initial AMF is an ultimate AMF that provides an access service for the UE. In this case, steps 306 and 307 can be replaced by that the AMF 1 itself determines the information about the network slice allowed for the UE. To be specific, the AMF 1 determines, based on the information about the network slice corresponding to the established PDN connection of the UE and the information about the subscribed network slice of the UE, the information about the network slice allowed for the UE. The method for determining, by the AMF 1, the information about the network slice allowed for the UE is the same as that used by the NSSF.

Step 308: The AMF 1 sends a handover reject message to the MME, and the MME receives the handover reject message sent by the AMF 1.

The handover reject message includes the information about the network slice allowed for the UE and the target AMF set.

Step 309: The MME receives the handover reject message sent by the AMF 1, and the MME selects one AMF from the target AMF set as a target AMF.

This embodiment of the present invention imposes no limitation on a specific method for selecting, by the MME, one AMF from the target AMF set as a target AMF.

Step 310: The MME sends a third request message to the selected target AMF (an AMF 2 in FIG. 3), where the third request message includes the information about the network slice allowed for the UE. The AMF 2 receives the third request message sent by the MME.

The third request message may be a handover request.

Step 311: The AMF 1 selects one AMF from the target AMF set as a target AMF.

Step 312: The AMF 1 sends the third request message to the selected target AMF (the AMF 2 in FIG. 3), where the third request message includes the information about the network slice allowed for the UE. The AMF 2 receives the third request message sent by the MME.

The third request message may be a handover request.

It should be noted that, the AMF 1 or the AMF 2 may determine, based on the information about the established PDN connection and the information about the network slice allowed for the UE, a PDN connection that cannot be handed over. For the PDN connection that cannot be handed over, the AMF 1 or the AMF 2 may return the handover reject message to the MME, where the handover reject message includes information about the PDN connection that cannot be handed over. Specifically, the AMF 1 or the AMF 2 may determine, based on the network slice allowed for the UE and the network slice corresponding to the established PDN connection, whether the network slice corresponding to the established PDN connection is included in the network slice allowed for the UE. If the network slice corresponding to the established PDN connection is not included in the network slice allowed for the UE, the AMF 1 or the AMF 2 determines that the PDN connection cannot be handed over. After determining the PDN connection that cannot be handed over, the AMF 1 or the AMF 2 returns the handover reject message to the MME, where the handover reject message carries the information about the PDN connection that cannot be handed over, so that the MME subsequently initiates a corresponding PDN connection release procedure.

In this embodiment of the present invention, during a handover of the UE from the 4G network to the 5G network, the MME determines the initial AMF. Then the initial AMF obtains, based on the information about the established PDN connection of the UE in the 4G network, the network slice corresponding to the established PDN connection of the UE, and further obtains, with reference to the information about the subscribed network slice of the UE, and the like, a network slice corresponding to the PDN connection that can be handed over to the 5G network. Therefore, it is ensured that when moving from a 4G coverage area in which the user equipment enjoys a DCN service in the 4G network to a coverage area of a 5G base station, the user equipment can be handed over to a proper network slice, and can still enjoy a network service equivalent to that in the original 4G network. The user equipment can be handed over to a network slice instance corresponding to the PDN connection in the 4G network, so that service continuity can be ensured while the user equipment can enjoy a network service equivalent to that in the original 4G network.

Figure 4:
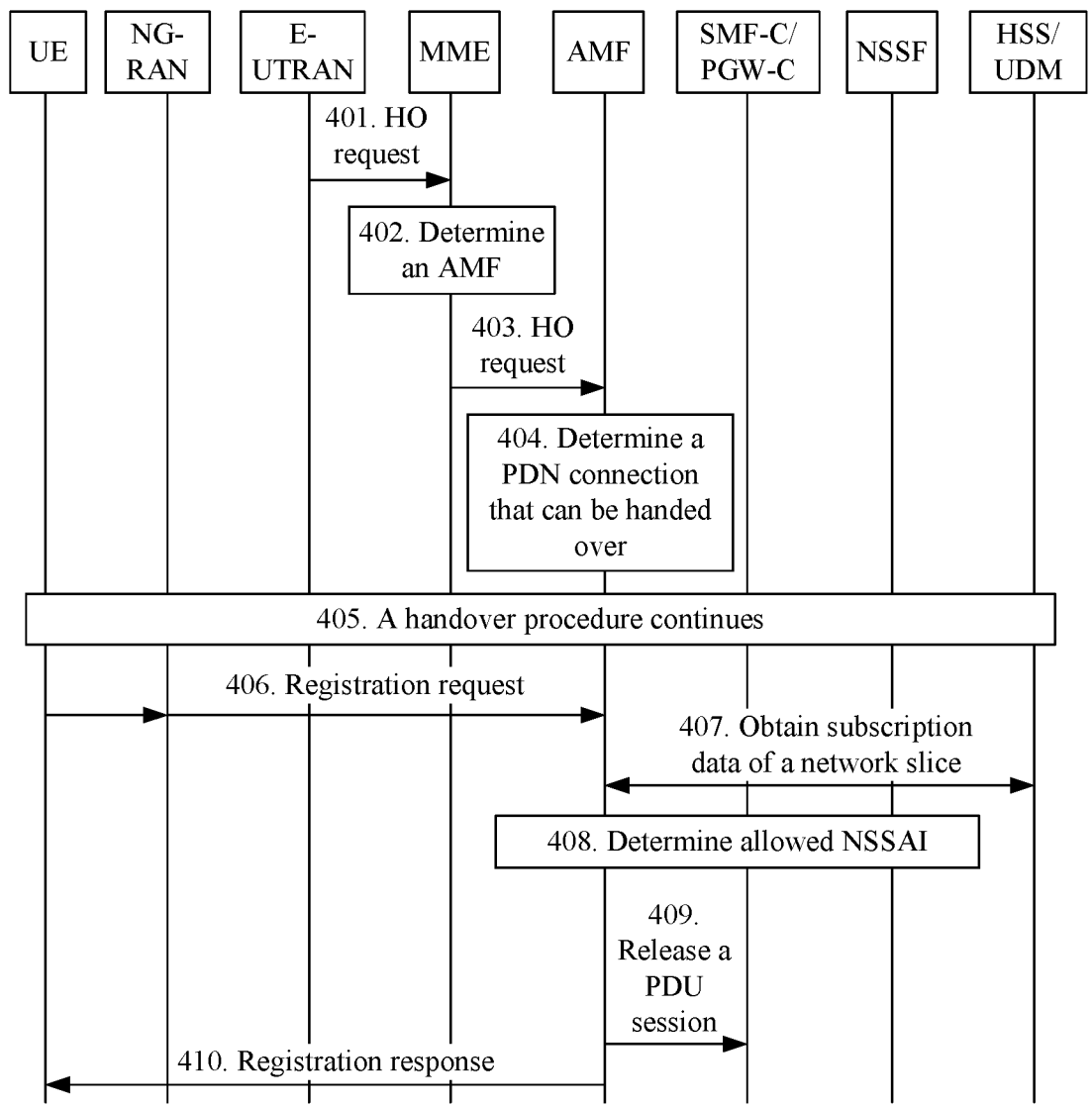
FIG. 4 is a schematic flowchart of another mobility management method according to an embodiment of this application.

In step 307 in the foregoing embodiment, it is mentioned that the initial AMF may be included in the target AMF set. When a network architecture is relatively simple, or the mapping relationship, configured in the MME, from the MME to the AMF set is accurate enough, it can be ensured, to an extent, that the selected initial AMF is included in the target AMF set. In this case, the AMF first determines PDN connections that can be handed over to the 5G network, and then hands over the PDN connections to a corresponding network slice in the 5G core network. Subsequently the 5G core network determines, based on information such as the subscribed network slice of the user equipment, the network slice allowed for the user equipment. For the PDN connections that correspond to a network slice that is not included in the network slice allowed for the user equipment, the 5G core network releases corresponding PDU sessions. In this way, a delay caused during a handover of the user equipment from the 4G network to the 5G network is reduced. As shown in FIG. 4, an embodiment of the present invention provides another mobility handover method.

Step 401: A source base station (E-UTRAN) sends a first handover request to an MME, where the first handover request includes information about a target access region. The MME receives the first handover request sent by the source base station.

Step 402: The MME determines an AMF.

Step 403: The MME sends a second handover request to the determined AMF, where the second handover request carries information about an established PDN connection. The AMF receives the second handover request sent by the MME.

The information about the established PDN connection includes an identifier of a PGW-C/SMF corresponding to the PDN connection.

Steps 401 to 403 are the same as steps 301 to 303. For related content, refer to the foregoing descriptions. Details are not described herein again.

Step 404: The AMF determines, based on the information about the established PDN connection, a PDN connection that can be handed over.

Specifically, for a PDN connection, the AMF determines, based on the information about the established PDN connection, whether the AMF can communicate with the corresponding PGW-C/SMF. If the AMF can communicate with the corresponding PGW-C/SMF, the AMF determines that the PDN connection can be handed over to the 5G network; otherwise, the PDN connection cannot be handed over to the 5G network.

Optionally, the AMF sends a handover reject message to the MME, where the handover reject message includes information about a PDN connection that cannot be handed over, and the information about the PDN connection that cannot be handed over is used to notify the MME of PDN connections that cannot be handed over to the 5G network. After receiving the message, the MME initiates release of the PDN connection. The message may be carried in a response message for the handover request, and sent to the MME.

Step 405: Perform a subsequent handover procedure in which a PDN connection in a 4G network that can be handed over to a 5G network is handed over to a corresponding network slice in the 5G network.

Step 406: After the handover procedure ends, UE initiates a registration request to the AMF.

Optionally, the registration request may include requested NSSAI (Requested NSSAI) of the UE.

Step 407: The AMF obtains subscription data of the UE from a user data management entity.

Step 408: The AMF obtains information about a network slice allowed for the UE.

The AMF may request an NSSF to determine, for the UE, the information about the allowed network slice, or the AMF itself may determine, for the UE, the information about the allowed network slice. For related content, refer to the descriptions in steps 306 and 307 in the foregoing embodiment. Details are not described herein again.

Step 409: The AMF determines a PDU session that needs to be released, and sends a session release request to a session management function entity. The session management function entity receives the session release request sent by the AMF.

For the PDN connection that is handed over in step 405, if a network slice corresponding to the PDN connection does not belong to the network slice allowed for the UE, the AMF needs to initiate the PDU session release request, to request the session management function entity to release the corresponding PDU session.

Step 410: The AMF returns a registration response to the UE, where the registration response carries the information about the network slice allowed for the UE.

It should be noted that step 410 and step 409 can be interchanged.

In this embodiment of the present invention, during a handover of the UE from the 4G network to the 5G network, the MME first determines the AMF. Then the AMF determines, based on the information about the established PDN connection of the UE in the 4G network, PDN connections that can be handed over to the 5G network. For the PDN connections that can be handed over to the 5G network, a handover to a 5G core network is first implemented, thereby preferably ensuring service continuity for a user, and reducing a handover delay. After the handover is implemented, it is then determined whether network slices corresponding to handed-over PDN connections are network slices allowed for the UE. For a PDN connection that correspond to a network slice that is not included in the network slices allowed for the UE, the 5G core network initiates the PDU session release request, to release a related PDU session, thereby ensuring rights and interests of an operator.

Figure 5:
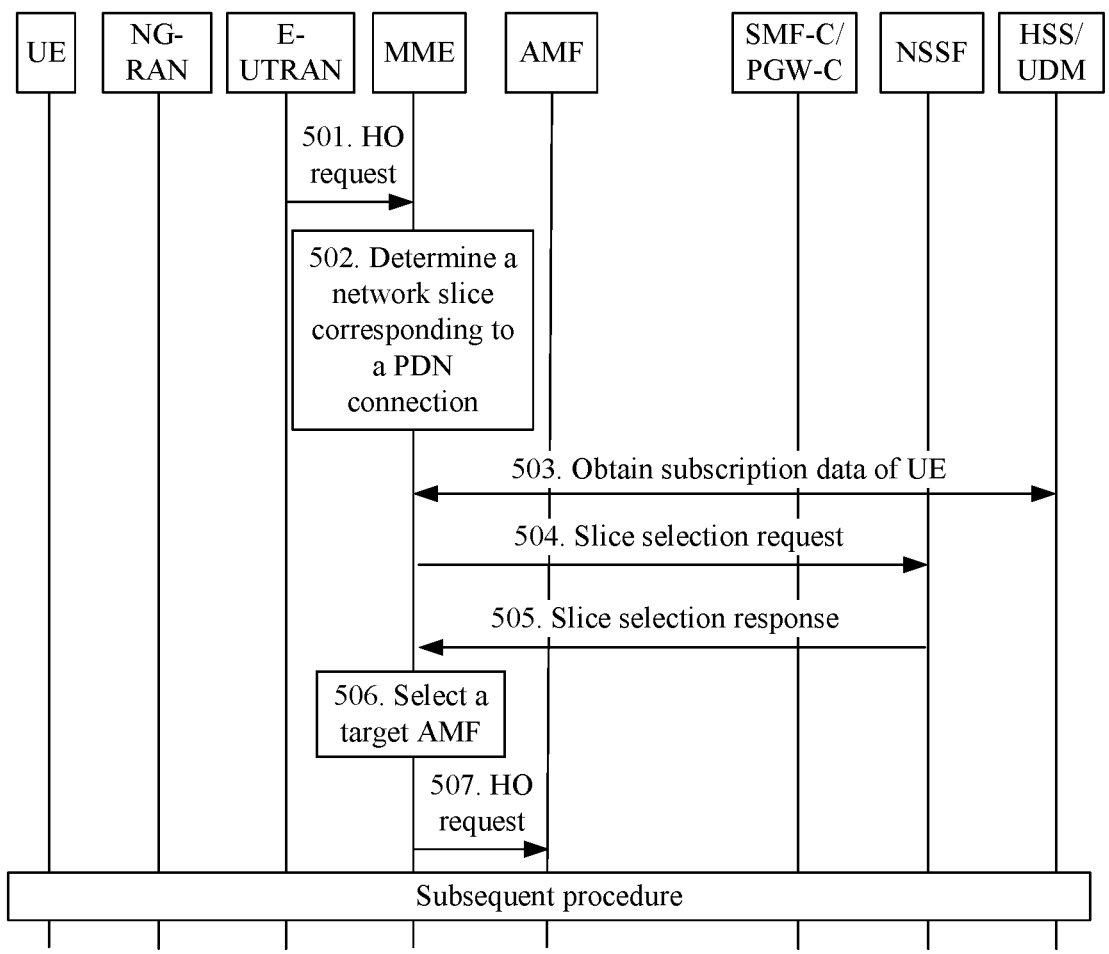
FIG. 5 is a schematic flowchart of still another mobility management method according to an embodiment of this application.

When UE is in a connected state, in some specific scenarios, there is interface communication between an MME and an NSSF in a network. As shown in FIG. 5, an embodiment of the present invention provides another mobility handover method.

Step 501: A source base station sends a handover request to the MME, where the handover request includes information about a target access region.

Step 502: The MME obtains information about an established PDN connection of user equipment from a context of the UE, and determines a corresponding network slice based on the information about the established PDN connection.

Step 503: The MME obtains subscription data of the UE from a user data management entity (HSS/UDM).

Step 504: The MME sends a slice selection request to the network slice selection function (NSSF). The NSSF receives the slice selection request sent by the MME.

Step 505: The NSSF returns a slice selection response to the MME, where the slice selection response includes information about a network slice allowed for the UE (Allowed NSSAI) and information about a target AMF set.

Step 506: The MME selects one AMF from the target AMF set as a target AMF.

Step 507: The MME sends a second handover request to the AMF, where the second handover request includes the information about the network slice allowed for the UE.

In the foregoing steps, step 501 is the same as step 301 in the foregoing embodiment, step 502 is the same as step 304 in the foregoing embodiment, step 503 is the same as step 305, step 504 is the same as step 306, step 505 is the same as step 307, and step 506 is the same as step 311. For related content, refer to the related descriptions. Details are not described herein again.

Figure 6:
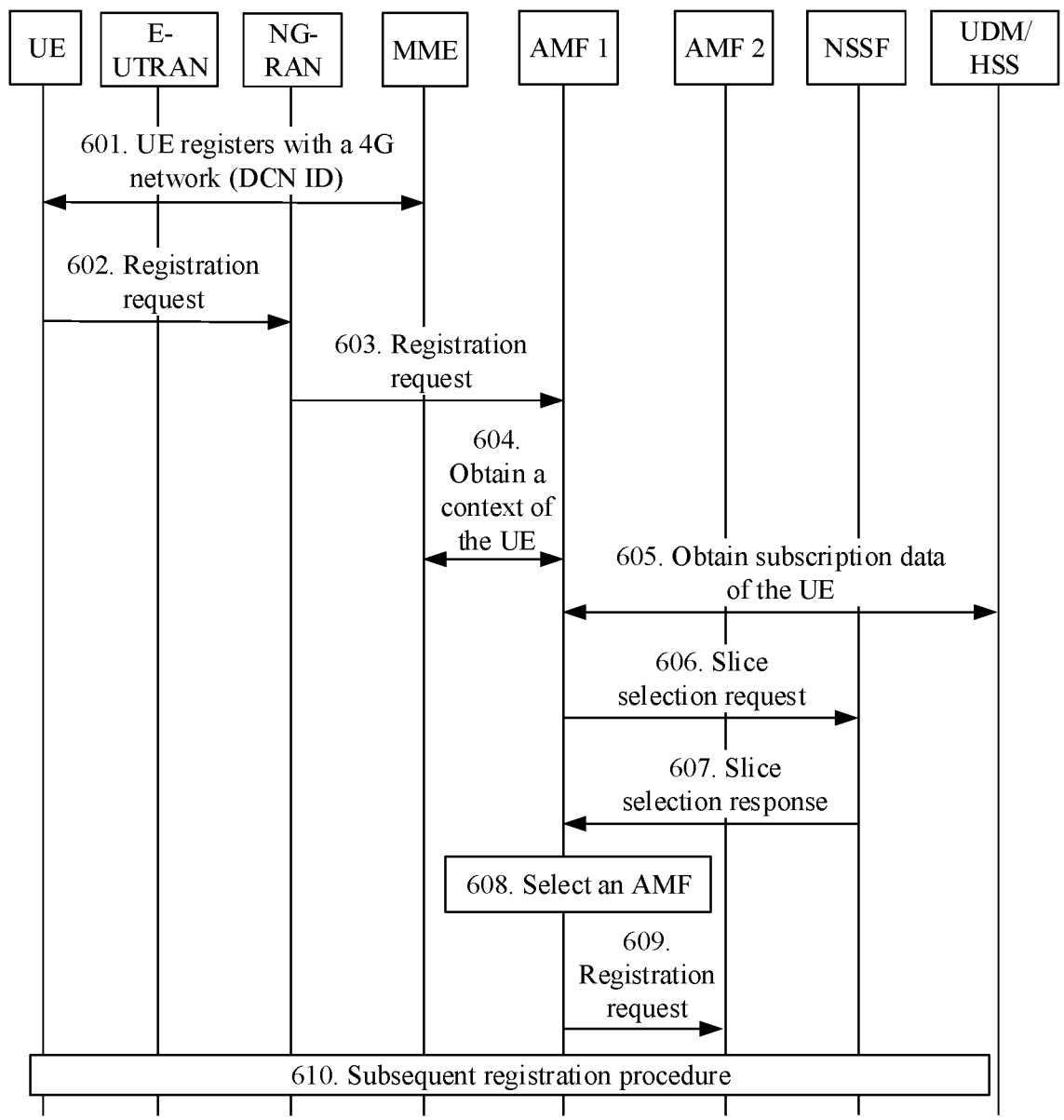
FIG. 6 is a schematic flowchart of yet another mobility management method according to an embodiment of this application.

FIG. 6 is a schematic flowchart of a mobility management method. In this embodiment, UE first registers with an MME in a 4G network by using a 4G base station, and the MME sends a DCN identifier and a 4G GUTI to the UE. Then the UE enters an idle state for a reason, and moves into a coverage area of a 5G base station. The UE registers with a 5G core network by using the 5G base station. In this embodiment, the UE moves to the coverage area of the 5G base station, and initiates a registration request to the 5G base station, to initiate a handover procedure.

Step 601: The UE registers with the 4G network by using the MME.

When the UE accesses the 4G network, the network selects a DCN for the UE, and the MME allocates the 4G GUTI to the UE. The 4G GUTI includes information about the MME, for example, an MME group identifier (MMEGI) and an MME code number (MME CODE).

Step 602: The UE initiates a registration request to the 5G base station, where the registration request includes a 5G GUTI mapped by the UE from the 4G GUTI. Optionally, the registration request further includes information about a network slice requested by the UE (Requested NSSAI). Optionally, the registration request further includes an identifier of a DCN accessed by the UE in the 4G network. The 5G base station receives the registration request sent by the UE.

That the UE maps the 4G GUTI to the 5G GUTI is specifically: mapping the MME group identifier to an AMF region identifier, and mapping the MME code number to an AMF set identifier; or mapping a part of the MME group identifier to an AMF region identifier, and mapping the other part of the MME group identifier to an AMF set identifier, for example, mapping eight high bits of the MME group identifier to the AMF region identifier, and mapping eight low bits of the MME group identifier to the AMF set identifier.

Step 603: The 5G base station determines an initial AMF (an AMF 1 in FIG. 6), and forwards the registration request to the AMF 1.

The 5G base station determines an initial AMF in a plurality of methods.

In a possible implementation, the base station determines the initial AMF based on the information, carried in the registration request, about the network slice requested by the UE.

In another possible implementation, a default AMF is configured in the base station. When receiving the registration request, the base station uses the default AMF as the initial AMF.

For still another possible implementation, refer to step 302 in the embodiment of FIG. 3. The base station determines a region in which the base station is located, determines the initial AMF set according to Table 1 with reference to the region in which the base station is located, and the DCN ID or an identifier of the MME, and selects one AMF from the initial AMF set as the initial AMF.

For yet another possible implementation, refer to step 302 in the embodiment of FIG. 3. The base station determines whether a region in which the base station is located is the same as an AMF region indicated by the 5G GUTI. If the region in which the base station is located is the same as the AMF region indicated by the 5G GUTI, the base station selects one AMF, as the initial AMF, from an AMF set indicated by the 5G GUTI; if the region in which the base station is located is different from the AMF region indicated by the 5G GUTI, the base station determines a target AMF set according to Table 2, and selects one AMF from the AMF set as the initial AMF. For example, the base station determines, based on the 5G GUTI of the UE, that the AMF region is X, the AMF set is A, and a region Y corresponding to the base station is not in X. The base station determines, according to Table 2, that a proper AMF set is B, and selects one AMF from B as the initial AMF according to a preset policy.

Step 604: The AMF 1 receives the registration request sent by the 5G base station, and obtains a context of the UE from the MME.

Specifically, the AMF 1 may determine the MME based on the 5G GUTI, and send a context request message to the determined MME. The MME sends the context of the UE to the AMF 1. The context of the UE includes information about an established PDN connection of the UE in the 4G network, and the information about the established PDN connection is specifically information about a PGW-C/SMF or an APN corresponding to the PDN connection.

Step 605: The AMF 1 obtains subscription data of the UE from a user data management entity (HSS/UDM).

Step 605 is the same as step 305 in the foregoing embodiment. For related content, refer to the foregoing descriptions. Details are not described herein again.

Similar to the embodiment of FIG. 3, the AMF 1 can determine, based on the information about the PDN connection, a network slice corresponding to the PDN connection. Alternatively, the NS SF may determine, based on the information about the PDN connection, a network slice corresponding to the PDN connection. In the following steps in this embodiment of the present invention, an example in which the NSSF determines, based on the information about the PDN connection, the network slice corresponding to the PDN connection is described.

Step 606: The AMF 1 sends a slice selection request to a network slice selection function (NSSF).

The slice selection request includes the information about the established PDN connection, information about a subscribed network slice of the UE, and the like.

Step 607: The NSSF receives the slice selection request sent by the AMF 1, and returns a slice selection response to the AMF 1, where the slice selection response includes information about a network slice allowed for the UE (Allowed NSSAI) and information about a target AMF set.

Step 607 is the same as step 307 in the foregoing embodiment. For related content, refer to the foregoing descriptions. Details are not described herein again.

The AMF 1 receives the slice selection response returned by the NSSF. When the AMF 1 determines, based on the target AMF set, that the AMF 1 can provide a service for the selected network slice, a subsequent registration procedure (namely, step 610) is directly performed. When the AMF 1 determines, based on the target AMF set, that the AMF 1 cannot provide a service for the selected network slice, the following steps 608 and 609 may be performed, that is, the AMF 1 selects one target AMF from the target AMF set for the UE, and sends the registration request to the target AMF.

Step 608: The AMF 1 selects one AMF from the target AMF set as a target AMF (an AMF 2).

Step 609: The AMF 1 forwards the registration request to the AMF 2, where the registration request includes the 5G GUTI of the UE and the information about the network slice allowed for the UE (Allowed NSSAI).

It should be noted that, for a PDN connection that cannot be handed over, the AMF 1 or the AMF 2 may return a handover reject message to the MME. Specifically, the AMF 1 or the AMF 2 may determine, based on the network slice allowed for the UE and the network slice corresponding to the established PDN connection, whether the network slice corresponding to the established PDN connection is included in the network slice allowed for the UE. If the network slice corresponding to the established PDN connection is not included in the network slice allowed for the UE, the AMF 1 or the AMF 2 determines that the PDN connection cannot be handed over. After determining the PDN connection that cannot be handed over, the AMF 1 or the AMF 2 returns the handover reject message to the MME, where the handover reject message carries information about the PDN connection that cannot be handed over, so that the MME subsequently initiates a corresponding PDN connection release procedure.

In this embodiment of the present invention, if the UE registers with the MME in the 4G network by using the 4G base station, and then is in an idle state, when moving to a coverage area of the 5G base station, the UE can be handed over to the 5G core network through a registration procedure. In this case, it is ensured that the UE can enjoy a network service equivalent to that in the 4G network.

Figure 7:
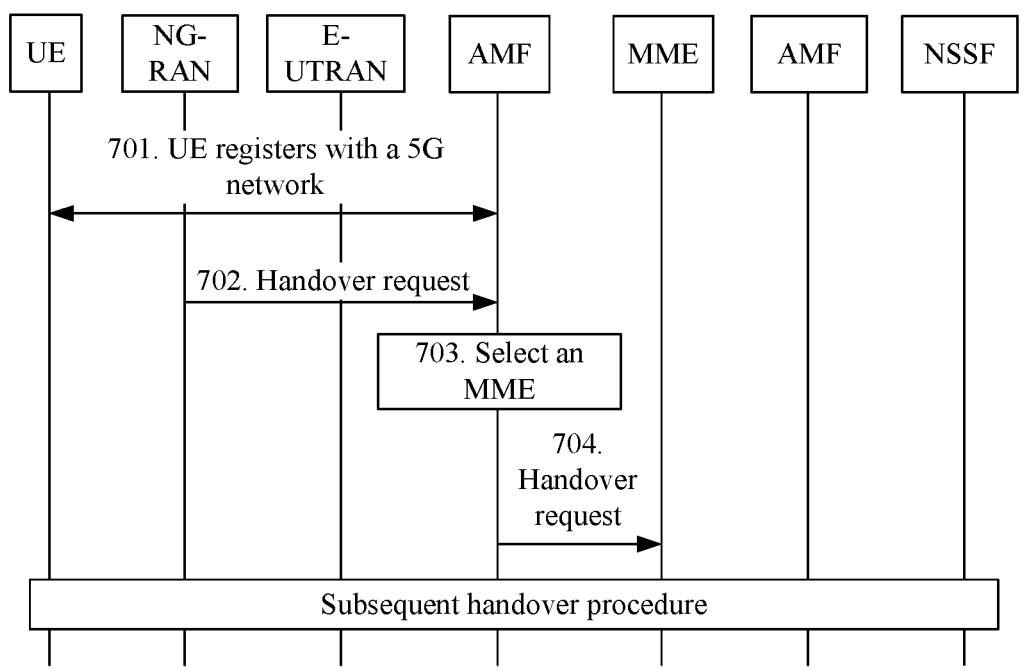
FIG. 7 is a schematic flowchart of still yet another mobility management method according to an embodiment of this application.

FIG. 7 is a schematic flowchart of a mobility handover method. In this embodiment, UE has currently registered with a 5G network by using an AMF, and the UE is in a connected state. When a source base station finds that the UE needs to be handed over, the source base station selects a target base station. In this embodiment, the target base station selected by the source base station is a base station connected to a 4G network (E-UTRAN). The source base station sends a handover request to the AMF, to initiate a handover procedure.

Step 701: The UE registers with the 5G network. In a process in which the UE registers with a 5GC, the AMF obtains 4G subscription data from an HSS/UDM, such as a usage type (Usage Type) of the UE, and stores the 4G subscription data into a context of the UE.

Step 702: The source base station (NG-RAN) determines that the UE needs to be handed over to the target base station (E-UTRAN), and the source base station sends a first handover request to the AMF, where the first handover request includes information about a target access region. The AMF receives the first handover request sent by the source base station.

Step 702 is the same as step 301 in the foregoing embodiment. For related content, refer to the foregoing embodiment. Details are not described herein again.

Step 703: The AMF selects an MME.

Specifically, the AMF determines, based on the information about the target access region carried in the first handover request, that the UE needs to be handed over to the 4G network. The AMF obtains a corresponding context of the UE based on an identifier of the user equipment, and determines, based on the UE usage type in the context, the MME that is to implement a handover operation. Alternatively, the AMF may obtain a corresponding context of the UE based on an identifier of the user equipment, and determine, based on a 5G GUTI in the context of the UE and the information about the target access region, the MME that is to implement a handover operation. Alternatively, the AMF may determine a corresponding DCN identifier based on the 5G GUTI of the UE, and then determine, based on the DCN identifier and the information about the target access region, the MME that is to implement a handover operation.

The method for determining, by the AMF based on the UE usage type, the MME that is to implement a handover operation is the same as a process, during a 4G intra-network handover, in which the source MME determines the target MME based on the UE usage type. Details are not described herein in this embodiment of the present invention.

The method for determining by the AMF based on the 5G GUTI of the UE and the information about the target access region, the MME that is to implement a handover operation is specifically as follows:

The AMF obtains, based on the 5G GUTI of the UE, information about an AMF serving the UE (an AMF region and an AMF set), then queries the following table based on a region (a target region) corresponding to the target access region, to determine a corresponding MME group, and selects one MME from the MME group as the MME that is to implement a handover operation.

TABLE 3

| AMF region | AMF set | Target region | MME group |
|---|---|---|---|
| X | A | Y | B |
| . . . | . . . | . . . | . . . |

That the AMF determines a corresponding DCN identifier based on the 5G GUTI of the UE, and then determines, based on the DCN identifier and the information about the target access region, the MME that is to implement a handover operation is specifically as follows:

The AMF obtains, based on the 5G GUTI of the UE, the information about the AMF serving the UE (the information about the AMF region and the information about the AMF set), further queries the following table, to determine the corresponding DCN identifier, and determines, based on the DCN identifier and the information about the target access region, the MME that is to implement a handover operation.

TABLE 4

| Source AMF region (optional) | AMF Set | DCN |
|---|---|---|
| X | A | B |
| ... | ... | ... |

For the method for selecting an MME based on the DCN identifier and the information about the target access region, refer to an existing standard.

According to the foregoing method for determining a target MME, the AMF may determine the target MME by the AMF itself, or may determine the target MME by querying another device in the network, for example, a DNS. When the AMF determines the target MME by querying the DNS, the foregoing Table 3 and Table 4 are configured in the DNS. The AMF sends related information to the DNS and the DNS returns a selected MME to the AMF.

Step 704: The AMF sends a second handover request to the target MME.

The second handover request includes the UE usage type and information about a PDN connection mapped from information about an established PDU session of the UE in the 5G network.

Specifically, before the AMF sends the second handover request to the target MME, the method further includes: mapping, by the AMF, the information about the established PDU session of the UE in the 5G network to the information about the PDN connection. The information about the PDU session includes a data network name (DNN) and corresponding S-NSSAI, and the information about the PDN connection is an APN.

That the AMF maps the information about the established PDU session of the UE in the 5G network to the information about the PDN connection is specifically: mapping, by the AMF, the DNN in the information about the PDU session to a corresponding APN according to a preset first mapping relationship; or mapping, by the AMF, the DNN and the S-NSSAI in the information about the PDU session to a corresponding APN according to a preset second mapping relationship.

The MME determines whether the UE usage type is supported, and determines, based on a subscribed APN and a configuration of the MME, whether the PDU session is allowed to be handed over to 4G DCN. For a PDU session that can be handed over, the MME requests the target base station to allocate a resource, to perform a subsequent handover procedure. For a PDN connection that cannot be handed over, the MME instructs the AMF to reject a handover to the PDN connection, and the AMF instructs an SMF corresponding to the rejected PDN connection to release a PDU session corresponding to the rejected PDN connection.

In this embodiment of the present invention, the AMF stores the 4G subscription data of the UE into the context of the UE in advance. When determining that an inter-network handover of the UE from 5G to 4G occurs, the AMF maps the information about the established PDU session in the 5G network to the information about the PDN connection, and determines a proper MME based on the 4G subscription data, to implement a fast inter-network handover. In addition, it is ensured that the UE can enjoy an equivalent network service when moving from 5G to 4G.

Figure 8:
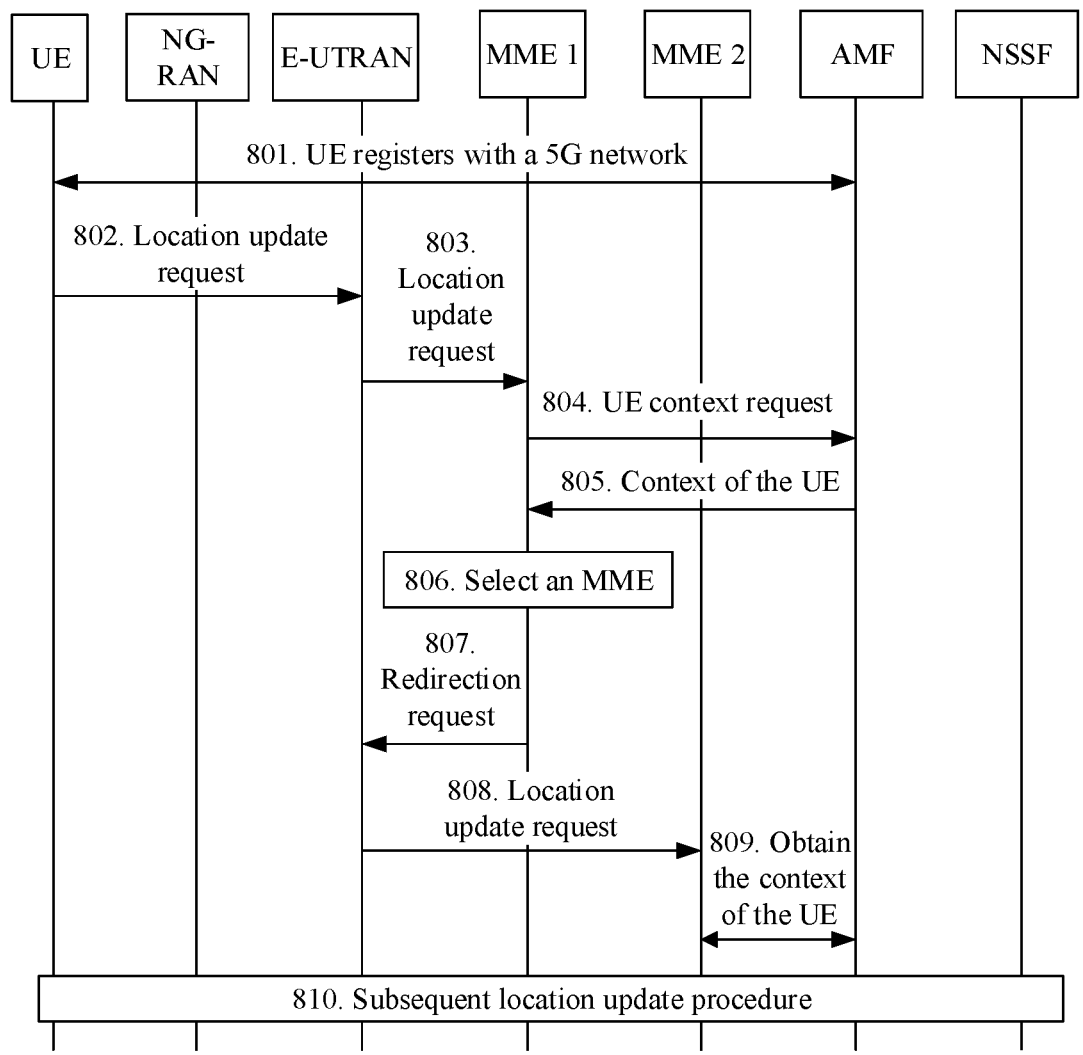
FIG. 8 is a schematic flowchart of a further mobility management method according to an embodiment of this application.

FIG. 8 is a schematic flowchart of a mobility handover method. In this embodiment, UE has registered with a 5G network by using an AMF, and the AMF has allocated allowed NSSAI to the UE. Then the UE enters an idle state for a reason, and moves into a coverage area of a 4G base station. The UE registers with a 4G network by sending a location update request. When sending a context of the UE to an initial MME, the AMF sends 4G subscription data (including UE usage type) of the UE to the initial MME, and the initial MME selects a target MME based on the UE usage type. Specifically, the method includes the following steps.

Step 801: The UE registers with the 5G network.

In a process in which the UE registers with a 5GC, the AMF obtains 4G subscription data from an HSS/UDM, such as a usage type (Usage Type) of the UE, and stores the 4G subscription data into a context of the UE.

Step 802: The UE sends a location update request to the 4G base station, where the location update request includes a 4G GUTI mapped by the UE from a 5G GUTI. The 4G base station receives the location update request sent by the UE.

Specifically, the UE determines, based on a tracking area identity list (TAI list) broadcast by the base station, that the UE moves out of an original registration region, and that a new target cell selected by the UE is a cell covered by the 4G base station. Therefore, the UE sends the location update request to the 4G base station. The UE sends the location update request to the 4G base station by using an RRC message between the UE and the 4G base station. If a DCN identifier is configured in the UE, the UE further adds the DCN identifier to the RRC message. The 4G base station selects an initial MME (an MME 1) for the UE based on the DCN identifier and location information of the UE. That the UE maps the 5G GUTI to the 4G GUTI specifically includes: mapping an AMF region identifier and an AMF set identifier included in the 5G GUTI to an MME group identifier; or mapping an AMF region identifier and an AMF set identifier included in the 5G GUTI to an MME group identifier and an MME code number. Specifically, the AMF region identifier is mapped to the MME group identifier, and the AMF set identifier is mapped to the MME code number; or the AMF region identifier is mapped to a part of the MME group identifier, and the AMF set identifier is mapped to the other part of the MME group identifier.

Step 803: The 4G base station forwards the location update request to an MME 1.

Step 804: The MME 1 receives the location update request sent by the 4G base station, determines an AMF based on the 4G GUTI, and sends a UE context request message to the AMF.

Step 805: The AMF sends the context of the UE to the MME 1, where the context of the UE includes a UE usage type and information about a PDN connection mapped from information about an established PDU session of the UE in the 5G network.

That the AMF maps information about an established PDU session of the UE in the 5G network to information about a PDN connection is specifically: mapping, by the AMF, the information about the established PDU session to the information about the PDN connection according to a configured mapping relationship, where the information about the PDU session includes a DNN and corresponding S-NSSAI, and the information about the PDN connection includes an APN. That the AMF maps information about an established PDU session of the UE in the 5G network to information about a PDN connection is specifically: mapping, by the AMF, the DNN in the information about the PDU session to a corresponding APN according to a preset first mapping relationship; or mapping, by the AMF, the DNN and the S-NSSAI in the information about the PDU session to a corresponding APN according to a preset second mapping relationship.

Step 806: The MME 1 selects a DCN and a target MME (an MME 2) for the user equipment based on the UE usage type.

In a possible case, the MME 1 determines, based on the UE usage type, that the target MME is the MME 1. In this case, a subsequent location update procedure (step 810) is performed. Otherwise, steps 807 to 809 are performed.

Step 807: The MME 1 sends a redirection request to the 4G base station, to request the 4G base station to send the location update request to the MME 2.

Step 808: The 4G base station sends the location update request to the MME 2.

Step 809: The MME 2 determines an AMF based on the 4G GUTI in the location update request, and obtains the context of the UE from the AMF.

The context of the UE includes the UE usage type and the information about the PDN connection mapped from the information about the established PDU session of the UE in the 5G network.

The UE and the MME 2 perform a subsequent location update procedure.

In this embodiment of the present invention, the AMF stores the 4G subscription data of the UE into the context of the UE in advance. When determining that an inter-network handover of the UE from 5G to 4G occurs, the AMF maps the information about the established PDU session in the 5G network to the information about the PDN connection, and determines a proper MME based on the 4G subscription data, to implement a fast inter-network handover. In addition, it is ensured that the UE can enjoy an equivalent network service when moving from 5G to 4G.

Figure 9:
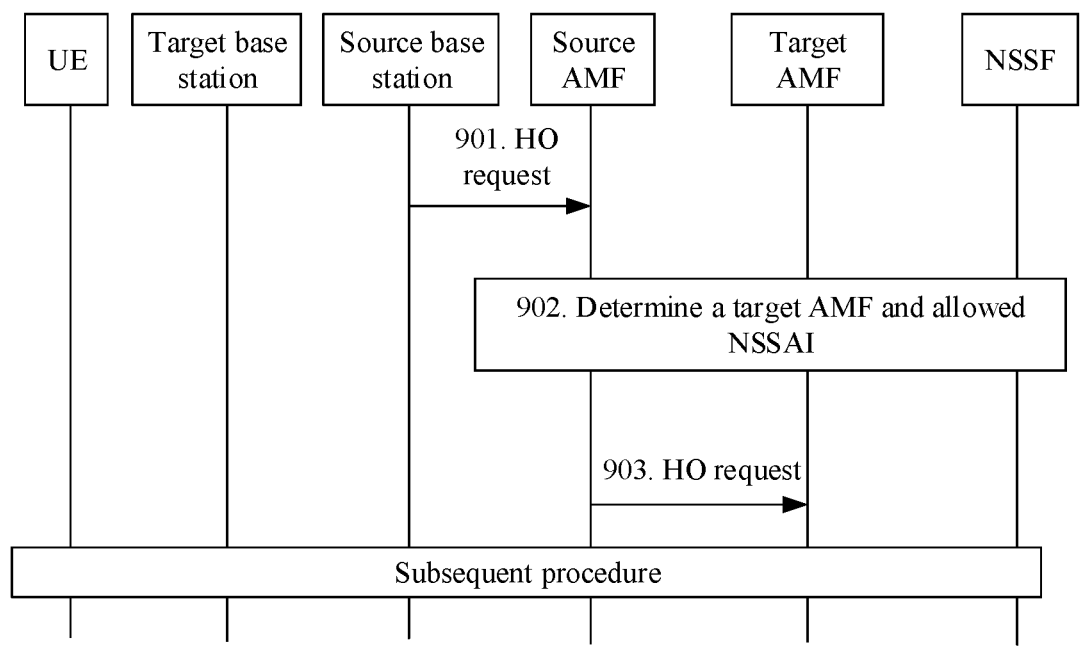
FIG. 9 is a schematic flowchart of a still further mobility management method according to an embodiment of this application.

When a location of UE in a connected state changes, and the UE moves from an AMF (source AMF) region to another AMF (target AMF) region, the source AMF obtains, based on information about an established PDU session (such as S-NSSAI, optionally including an identifier of a network slice instance), the location of the UE, and information about a subscribed network slice of the UE, information about a network slice allowed for the UE. As shown in FIG. 9, a mobility management method is provided, including the following steps.

Step 901: A source base station sends a first handover request to the source AMF, where the first handover request includes information about a target access region.

Specifically, the first handover request may be sent by the source base station to the source AMF after a decision is made based on cell measurement information reported by the user equipment. The information about the target access region may include at least one of an identifier of a target cell, an identifier of a target base station, and an identifier of a target tracking area. The identifier of the target cell is used to uniquely identify a target cell, and the target cell is a cell to be accessed by the UE. The identifier of the target base station is used to uniquely identify a target base station, and the target base station is a base station to which the to-be-accessed cell belongs. The identifier of the target tracking area is used to uniquely identify a target tracking area, and the target tracking area is a tracking area in which the to-be-accessed cell is located.

Step 902: The source AMF receives the first handover request sent by the source base station, and determines a target AMF and information about a network slice allowed for the UE.

Specifically, the source AMF determines a target AMF in following several methods.

In a possible implementation, as shown in Table 2 in the foregoing embodiment, a mapping relationship between information about the source AMF (information about a region in which the source AMF is located and information about a set to which the source AMF belongs), a target region, and a target AMF set is configured locally in the source AMF or in another device (for example, a network repository function NRF entity) in a network. Specifically, the source AMF queries the mapping relationship based on the information about the AMF region in which the source AMF is located, the information about the AMF set to which the source AMF belongs, and the information about the target access region, to determine the target AMF set. Then the source AMF selects one AMF from the target AMF set as a target AMF according to a preset policy.

In another possible implementation, the source AMF sends a slice selection request to an NSSF, and the slice selection request includes information about a network slice requested by the UE (Requested NSSAI), information about an established PDU session, and information about a subscribed network slice of the UE. The NSSF determines, based on the information about the network slice requested by the UE (Requested NSSAI), the information about the established PDU session, and the information about the subscribed network slice of the UE, the information about the network slice allowed for the UE and information about the target AMF set. The information about the target AMF set may be a list including an identifier of the target AMF set or an identifier of a candidate AMF. Optionally, the information about the established PDU session in the slice selection request may be replaced with information that is about a network slice corresponding to the established PDU session (corresponding S-NSSAI, optionally, further including an identifier of a network slice instance) and that is determined by the source AMF based on the information about the established PDU session. The information about the network slice requested by the UE (Requested NSSAI) and the information about the established PDU session may be obtained from a context of the UE by the source AMF based on an identifier of the UE. The information about the established PDU session may be an identifier of an SMF corresponding to the PDU session.

Step 903: The source AMF sends a second handover request to the target AMF, where the second handover request includes the information about the network slice allowed for the UE. The target AMF receives the second handover request sent by the source AMF.

Optionally, the method further includes: determining, by the source AMF based on the information about the established PDU session and the information about the network slice allowed for the UE, a PDU session that cannot be handed over, and sending, by the source AMF, a PDU session release request message to an SMF corresponding to the PDU session that cannot be handed over.

According to the method provided in this embodiment of the present invention, when the UE in a connected state moves from an AMF region to another AMF region, a proper AMF may be selected to provide, for the UE, a service of accessing an allowed network slice.

Figure 10:
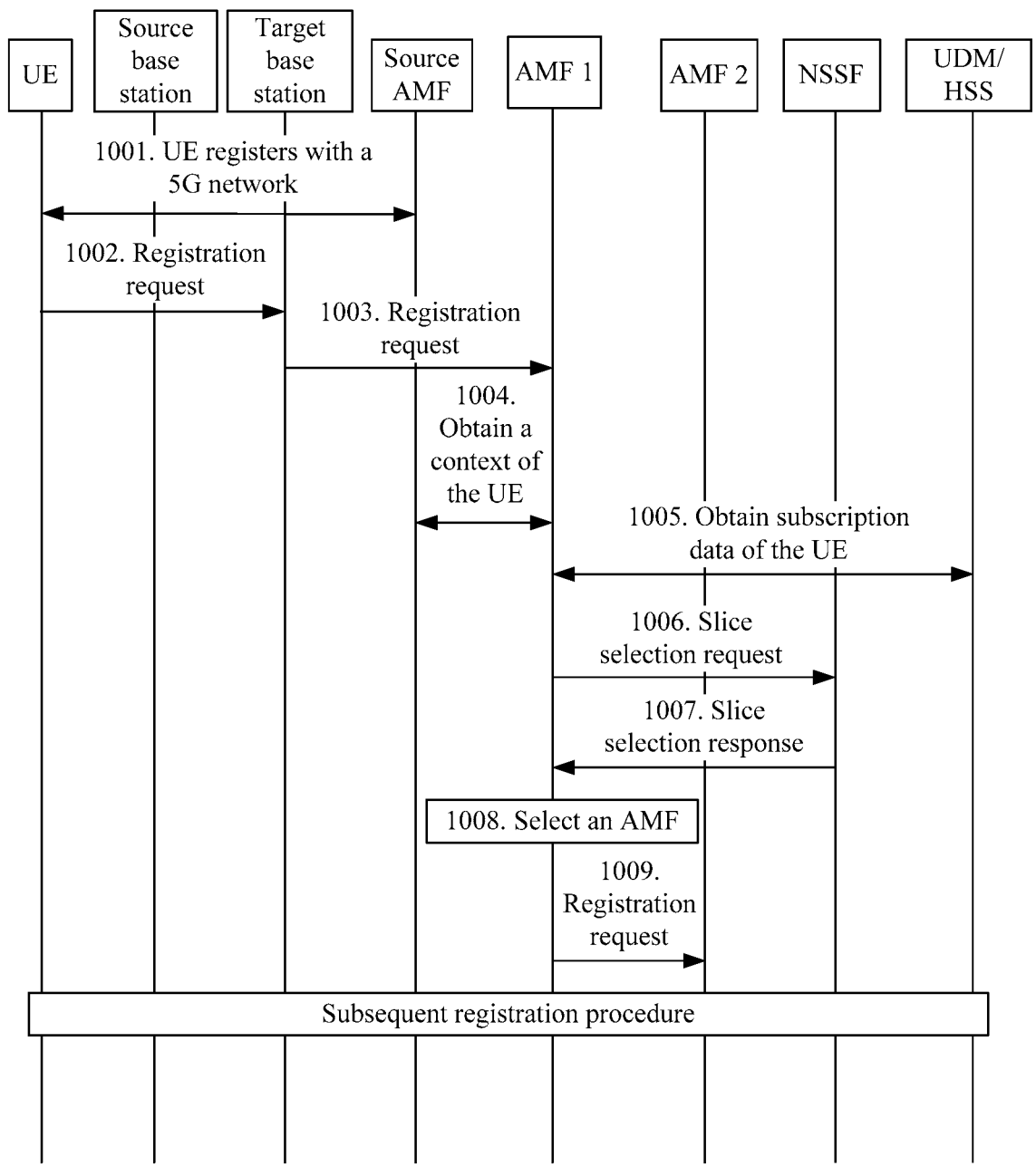
FIG. 10 is a schematic flowchart of a yet further mobility management method according to an embodiment of this application.

When UE registers with an AMF (a source AMF) in a 5G network, the source AMF allocates a 5G GUTI to the UE. Then the UE enters an idle state for a reason, and moves from an AMF (source AMF) region to another AMF (target AMF) region. In this case, the UE re-accesses the 5G network through a registration procedure. As shown in FIG. 10, a mobility management method is provided and includes the following steps.

Step 1001: The UE registers with the 5G network by using the source AMF.

When the UE registers with the 5G network by using the source AMF, the source AMF allocates a 5G GUTI to the UE. The 5G GUTI includes information about the source AMF, for example, information about a region in which the source AMF is located and information about a set to which the source AMF belongs.

Step 1002: The UE initiates a registration request to a target base station.

The registration request includes the 5G GUTI allocated by the source AMF to the UE. Optionally, the registration request further includes information (Requested NSSAI) about a network slice requested by the UE.

Step 1003: The target base station determines an initial AMF (an AMF 1 in FIG. 10), and forwards the registration request to the AMF 1.

The target base station determines the initial AMF in a plurality of methods:

In a possible implementation, the target base station determines the initial AMF based on the information about the network slice requested by the UE carried in the registration request.

In another possible implementation, a default AMF is configured in the base station. When receiving the registration request, the base station uses the default AMF as the initial AMF.

In another possible implementation, the target base station queries a DNS based on the information about the region in which the source AMF is located and the information about the AMF set to which the source AMF belongs that are carried in the GUTI of the UE, and current region information of the target base station (a location of the target base station), to obtain the information about the target AMF set, where the mapping relationship shown in Table 2 is configured in the DNS. The information about the target AMF set may be an identifier of the target AMF set or a list of identifiers of candidate target AMFs. Then the target base station selects one AMF from the target AMF set as the initial AMF according to a preset policy.

Step 1004: The AMF 1 receives the registration request sent by the target base station, and obtains a context of the UE from the source AMF.

Specifically, the AMF 1 determines the source AMF based on the GUTI in the registration request, and sends a UE context obtaining request to the source AMF. The context of the UE includes information about an established PDU session of the UE, and the information about the established PDU session includes an identifier of an SMF corresponding to the PDU session.

Step 1005: The AMF 1 obtains subscription data of the UE from a user data management entity (HSS/UDM).

Step 1006: The AMF 1 sends a slice selection request to a network slice selection function (NSSF).

Step 1007: The NSSF returns a slice selection response to the AMF 1, where the slice selection response includes information about a network slice allowed for the UE (Allowed NSSAI) and information about a target AMF set.

Step 1008: The AMF 1 selects one AMF from the target AMF set as a target AMF (an AMF 2).

Step 1009: The AMF 1 forwards the registration request to the AMF 2, where the registration request includes the 5G GUTI of the UE and the information about the network slice allowed for the UE (Allowed NSSAI).

Steps 1005 to step 1009 are the same as related steps in the foregoing embodiments. Details are not described herein again.

It should be noted that, for a PDU session that cannot be handed over, the AMF 1 or the AMF 2 may return a handover reject message to the source AMF. Specifically, the AMF 1 or the AMF 2 may determine, based on the network slice allowed for the UE and a network slice corresponding to the established PDU session, whether the network slice corresponding to the established PDU session is included in the network slice allowed for the UE. If the network slice corresponding to the established PDU session is not included in the network slice allowed for the UE, the AMF 1 or the AMF 2 determines that the PDU session cannot be handed over. After determining the PDU session that cannot be handed over, the AMF 1 or the AMF 2 returns the handover reject message to the source AMF, where the handover reject message carries information about the PDU session that cannot be handed over, so that the source AMF subsequently sends a PDU session release request message to an SMF corresponding to the PDU session that cannot be handed over.

In this embodiment of the present invention, if the UE registers with the source AMF in the 5G network by using the source base station, and then is in an idle state, when moving from an AMF (source AMF) region to another AMF (target AMF) region, the UE can re-register with the 5G network through a registration procedure. In this case, the UE can implement a mobility handover.

The solutions in the embodiments of the present invention are mainly described above from a perspective of interaction between network elements. It can be understood that, to implement the foregoing functions, the mobility management entity (AMF or MME) and various base stations include a corresponding hardware structure and/or software module for performing the functions. A person skilled in the art should easily be aware that, the present invention can be implemented in a form of hardware or in a form of a combination of hardware and computer software with reference to the example units and algorithm steps described in the embodiments disclosed in this specification. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of the present invention.

Figure 11:
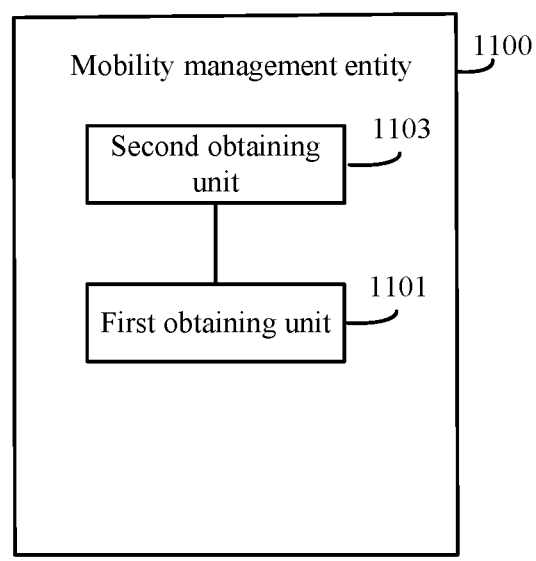
FIG. 11 is a schematic structural diagram of a mobility management apparatus according to an embodiment of this application.

In the embodiments of the present invention, division of function modules may be performed for the mobility management entity according to the foregoing method examples. For example, the function modules may be divided to correspond to the functions, or two or more functions may be integrated into a processing module. The integrated module may be implemented in a form of hardware, or may be implemented in a form of a software function module. It should be noted that the module division in the embodiments of the present invention is an example, and is merely logical function division and may be other division in actual implementation. For example, if the function modules are divided to correspond to the functions, FIG. 11 is a possible schematic structural diagram of a mobility management apparatus in the foregoing embodiments. The apparatus 1100 includes: a first obtaining unit 1101 and a second obtaining unit 1103. The first obtaining unit 1101 is configured to obtain information about an established PDN connection and information about a subscribed network slice of user equipment UE. The second obtaining unit 1103 is configured to obtain, based on the information about the established PDN connection and the information about the subscribed network slice, information about a network slice allowed for the UE.

Optionally, that the second obtaining unit 1103 is configured to obtain, based on the information about the established PDN connection and the information about the subscribed network slice, information about a network slice allowed for the UE is specifically: determining, based on the information about the established PDN connection, information about a network slice corresponding to the established PDN connection; and obtaining, based on the information about the network slice corresponding to the established PDN connection and the information about the subscribed network slice, the information about the network slice allowed for the UE.

In a possible implementation, that the second obtaining unit 1103 is configured to obtain, based on the information about the established PDN connection, information about a network slice corresponding to the established PDN connection is specifically: obtaining the information about the network slice corresponding to the established PDN connection from a session management function entity corresponding to the established PDN connection.

In a possible implementation, that the second obtaining unit 1103 is configured to obtain, based on the information about the network slice corresponding to the established PDN connection and the information about the subscribed network slice, the information about the network slice allowed for the UE is specifically: sending a slice selection request to a network slice selection function entity, where the slice selection request includes the information about the network slice corresponding to the established PDN connection and the information about the subscribed network slice; and receiving a slice selection response returned by the network slice selection function entity, where the slice selection response includes the information about the network slice allowed for the UE.

In a possible implementation, that the second obtaining unit 1103 is configured to obtain, based on the information about the established PDN connection and the information about the subscribed network slice, information about a network slice allowed for the UE is specifically: sending a slice selection request to a network slice selection function entity, where the slice selection request includes the information about the established PDN connection and the information about the subscribed network slice; and receiving a slice selection response returned by the network slice selection function entity, where the slice selection response includes the information about the network slice allowed for the UE.

The information about the established PDN connection is an identifier of a session management function entity corresponding to the PDN connection or an access point name APN corresponding to the PDN connection.

All related content of the steps in the foregoing method embodiments can be used for function descriptions of the corresponding function modules. Details are not described herein again.

The foregoing mobility management apparatus can be implemented on an integrated circuit (IC), a radio frequency integrated circuit (RFIC), a printed circuit board (PCB), or the like. In addition, the apparatus can be an independent device, or may be a part of a relatively large device. All related content of the steps in the foregoing method embodiments can be used for function descriptions of the corresponding function modules. Details are not described herein again.

In this embodiment, the mobility management apparatus 1100 is presented in a form of dividing the function modules to correspond to the functions, or the mobility management apparatus 1100 is presented in a form of dividing the function modules in an integrated manner. The "module" herein may be an application-specific integrated circuit (ASIC), a circuit, a processor and a memory for executing one or more software or firmware programs, an integrated logic circuit, and/or another device capable of providing the foregoing functions. In a simple embodiment, a person skilled in the art may figure out that the mobility management apparatus 1100 may be implemented in a form shown in FIG. 2.

For example, the processor 21 in FIG. 2 can invoke a computer executable instruction stored in the memory 23, so that the mobility management apparatus performs the mobility management method in the foregoing method embodiments. Specifically, the functions/an implementation process of the first obtaining unit 1101 and the second obtaining unit 1103 in FIG. 11 can be implemented by the processor 21 in FIG. 2 invoking the computer executable instruction stored in the memory 23.

Figure 12:
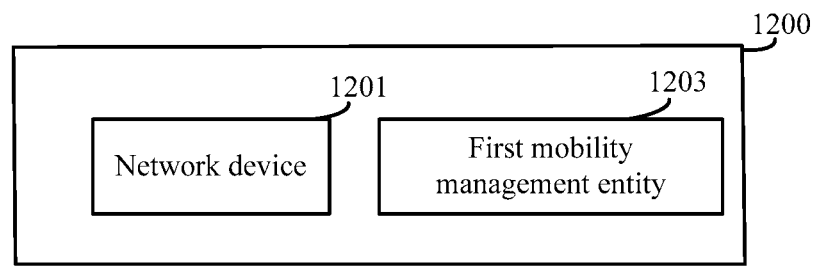
FIG. 12 is a schematic diagram of a mobility management system according to an embodiment of this application.

As shown in FIG. 12, a mobility management system 1200 is further provided, and the system includes a network device 1201 and a first mobility management entity 1203.

The network device 1201 is configured to: obtain a first mobility management entity based on a globally unique temporary identifier GUTI of user equipment UE or an identifier of a dedicated core network accessed by the UE, and information about a target access region of the UE, and send a first request message to the first mobility management entity, where the GUTI includes information about a mobility management entity serving the UE.

The first mobility management entity 1203 is configured to: obtain information about an established PDN connection and information about a subscribed network slice of the UE based on the received first request message, and obtain, based on the information about the established PDN connection and the information about the subscribed network slice, information about a network slice allowed for the UE.

In a possible implementation, the first request message is a handover request or a registration request. When the first request message is a handover request, the first request message includes the information about the established PDN connection. When the first request message is a registration request, the first request message includes the GUTI. That the first mobility management entity is configured to obtain information about an established PDN connection of the UE based on the received first request message is specifically: obtaining, by the first mobility management entity based on the information that is about the mobility management entity serving the UE and that is included in the GUTI, the information about the established PDN connection from the mobility management entity serving the UE.

In a possible implementation, the information about the mobility management entity MME serving the UE is an identifier of the mobility management entity, where the identifier of the MME includes an identifier of an MME group to which the MME belongs and an MME code number. That the network device obtains a first mobility management entity based on a globally unique temporary identifier GUTI of user equipment UE and information about a target access region of the UE is specifically: obtaining, by the network device, the first mobility management entity based on the identifier of the MME and the information about the target access region.

Optionally, the information about the mobility management entity serving the UE is information about an access and mobility management function AMF, where the information about the AMF includes information about a region in which an AMF serving the UE is located and information about a set to which the AMF serving the UE belongs. That the network device obtains a first mobility management entity based on a globally unique temporary identifier GUTI of user equipment UE and information about a target access region of the UE is specifically: obtaining, by the network device, the first mobility management entity based on the information about the region in which the AMF serving the UE is located, the information about the set to which the AMF serving the UE is located, and the information about the target access region.

It should be noted that, the first mobility management entity 1203 is the same as the mobility management apparatus in FIG. 11. All related content of the steps in the foregoing method embodiments can be used for function descriptions of the first mobility management entity 1203. Details are not described herein again.

Optionally, an embodiment of this application further provides a chip system, and the chip system includes a processor, configured to support a mobility management apparatus in implementing the foregoing mobility management method. In a possible design, the chip system further includes a memory. The memory is configured to store a program instruction and data that are necessary for the mobility management apparatus. The chip system may include a chip, or may include a chip and another discrete device. This is not specifically limited in this embodiment of this application.

Although the present invention is described with reference to the embodiments, in a process of implementing the present invention that claims protection, a person skilled in the art may understand and implement another variation of the disclosed embodiments by viewing the accompanying drawings, disclosed content, and the accompanying claims. In the claims, "comprising" (comprising) does not exclude another component or another step, and "a" or "one" does not exclude a meaning of plurality. A single processor or another unit may implement several functions enumerated in the claims. Some measures are recorded in dependent claims that are different from each other, but this does not mean that these measures cannot be combined to produce a better effect.

A person skilled in the art should understand that the embodiments of the present invention may be provided as a method, an apparatus (device), or a computer program product. Therefore, the present invention may use a form of hardware only embodiments, software only embodiments, or embodiments with a combination of software and hardware. Moreover, the present invention may use a form of a computer program product that is implemented on one or more computer-usable storage media (including but not limited to a disk memory, a CD-ROM, an optical memory, and the like) that include computer-usable program code. The computer program is stored/distributed in a proper medium and is provided as or used as a part of the hardware together with another hardware, or may also use another allocation form, such as by using the Internet or another wired or wireless telecommunications system.

The present invention is described with reference to the flowcharts and/or block diagrams of the method, the apparatus (device), and the computer program product according to the embodiments of the present invention. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more procedures in the flowcharts and/or in one or more blocks in the block diagrams.

These computer program instructions may also be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may also be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more procedures in the flowcharts and/or in one or more blocks in the block diagrams.

Although the present invention is described with reference to specific features and the embodiments thereof, obviously, various modifications and combinations may be made to them without departing from the spirit and scope of the present invention. Correspondingly, the specification and accompanying drawings are merely examples of the present invention defined by the accompanying claims, and is considered as any or all of modifications, variations, combinations or equivalents that cover the scope of the present invention. Obviously, a person skilled in the art can make various modifications and variations to the present invention without departing from the spirit and scope of the present invention. The present invention is intended to cover these modifications and variations provided that they fall within the scope of protection defined by the following claims and their equivalent technologies.

What is claimed is:

1. A mobility management system, wherein the system comprises:
    a first mobility management entity configured to:
        obtain an identifier of a session management function entity corresponding to an established Packet Data Network (PDN) connection of user equipment (UE) and information about a subscribed network slice of the UE;

send, based on the identifier of the session management function entity, a first request message to the session management function entity;

receive a first response message from the session management function entity, wherein the first response message comprises information about the network slice corresponding to the established PDN connection; and obtain, based on the information about the network slice corresponding to the established PDN connection and the information about the subscribed network slice, information about a network slice allowed for the UE; and the session management function entity configured to:
receive, from the first mobility management entity, the first request message; and in response to the first request message, send the first response message to the first mobility management entity.

2. The system according to claim 1, wherein:
the system further comprises a network slice selection function entity;
the first mobility management entity is further configured to:
send a slice selection request to the network slice selection function entity; wherein the slice selection request comprises the information about the network slice corresponding to the established PDN connection and the information about the subscribed network slice of the UE; and
receive a slice selection response from the network slice selection function entity, wherein the slice selection response comprises the information about the network slice allowed for the UE; and
the network slice selection function entity is configured to:
receive the slice selection request from the first mobility management entity;
determine, based on the information about the network slice corresponding to the established PDN connection and the information about the subscribed network slice of the UE, information about the network slice allowed for the UE; and
send the slice selection response to the first mobility management entity.

3. The system according to claim 2, wherein the network slice selection function entity is further configured to:
determine, based on the information about the network slice corresponding to the established PDN connection and the information about the subscribed network slice of the UE, a target access and mobility management functions (AMF) set, and wherein the slice selection response further comprises the target AMF set.

4. The system according to claim 3, wherein the first mobility management entity is further configured to:
determine, based on the target AMF set, a second mobility management entity; and
send a third request message to the second mobility management entity, wherein the third request message comprises the information about a network slice allowed for the UE.

5. The system according to claim 1, wherein the first mobility management entity is further configured to:

receive the identifier of the session management function entity from a third mobility management entity.

6. The system according to claim 1, wherein the first mobility management entity is further configured to:
obtain the information about the subscribed network slice of the UE from a unified data management entity.

7. The system according to claim 1, wherein the identifier of the session management function entity is a fully qualified domain name of the session management function entity.

8. A mobility management method, wherein the method comprises:
obtaining, by a first mobility management entity, an identifier of a session management function entity corresponding to an established Packet Data Network (PDN) connection of user equipment (UE) and information about a subscribed network slice of the UE;
sending, by the first mobility management entity based on the identifier of the session management function entity, a first request message to the session management function entity;
receiving, by the session management function entity, the first request message from the first mobility management entity;
in response to the first request message, sending, by the session management function entity, a first response message to the first mobility management entity, wherein the first response message comprises information about the network slice corresponding to the established PDN connection;
receiving, by the first mobility management entity, the first response message from the session management function entity; and
obtaining, by the first mobility management entity based on the information about the network slice corresponding to the established PDN connection and the information about the subscribed network slice, information about a network slice allowed for the UE.

9. The method according to claim 8, wherein before obtaining the information about the network slice allowed for the UE, the method further comprises:
sending, by the first mobility management entity, a slice selection request to a network slice selection function entity, wherein the slice selection request comprises the information about the network slice corresponding to the established PDN connection and the information about the subscribed network slice;
receiving, by the network slice selection function entity, the slice selection request from the first mobility management entity;
determining, by the network slice selection function entity based on the information about the network slice corresponding to the established PDN connection and the information about the subscribed network slice of the UE, information about the network slice allowed for the UE;
sending, by the network slice selection function entity, a slice selection response to the first mobility management entity; wherein the slice selection response comprises the information about the network slice allowed for the UE; and
receiving, by the first mobility management entity, the slice selection response from the network slice selection function entity.

10. The method according to claim 9, the method further comprising:
determining, by the network slice selection function entity, a target access and mobility management functions (AMF) set, and wherein the slice selection response further comprises the target AMF set.

11. The method according to claim 10, the method further comprising:
determining, by the first mobility management entity based on the target AMF set, a second mobility management entity; and
sending, by the first mobility management entity, a third request message to the second mobility management entity, wherein the third request message comprises the information about a network slice allowed for the UE.

12. The method according to claim 8, wherein obtaining the information about the subscribed network slice of the UE comprises:
obtaining, by the first mobility management entity, the information about the subscribed network slice of the UE from a unified data management entity.

13. The method according to claim 8, wherein the obtaining the identifier of the session management function entity corresponding to an established PDN connection comprising:
receiving, by the first mobility management entity, the identifier of the session management function entity from a third mobility management entity.

14. The method according to claim 13, wherein the method further comprises:
sending, by the first mobility management entity, a PDN connection handover reject message to the third mobility management entity, wherein the PDN connection handover reject message comprises information about a PDN connection that cannot be handed over, wherein the PDN connection that cannot be handed over is any one of the established PDN connection.

15. A mobility management apparatus, comprising:
at least one processor; and
a memory coupled to the at least one processor and having program instructions stored thereon which, when executed by the at least one processor, cause the apparatus to perform operations comprising:
obtaining an identifier of a session management function entity corresponding to an established Packet Data Network (PDN) connection of user equipment (UE) and information about a subscribed network slice of the UE;
sending, based on the identifier of the session management function entity, a first request message to the session management function entity;
receiving a first response message from the session management function entity, wherein the first response message comprises information about the network slice corresponding to the established PDN connection; and
obtaining, based on the information about the network slice corresponding to the established PDN connection and the information about the subscribed network slice, information about a network slice allowed for the UE.

16. The mobility management apparatus according to claim 15, wherein of obtaining the information about the network slice allowed for the UE comprises:
sending a slice selection request to a network slice selection function entity, wherein the slice selection request comprises the information about the network slice corresponding to the established PDN connection and the information about the subscribed network slice; and
receiving a slice selection response from the network slice selection function entity, wherein the slice selection response comprises the information about the network slice allowed for the UE.

17. The mobility management apparatus according to claim 16, wherein the slice selection response further comprises a target access and mobility management functions (AMF) set.

18. The mobility management apparatus according to claim 17, wherein the operations further comprise:
determining, based on the target AMF set, a second mobility management entity; and
sending a third request message to the second mobility management entity, wherein the third request message comprises the information about the network slice allowed for the UE.

19. The mobility management apparatus according to claim 15, wherein obtaining the information about the subscribed network slice of the UE comprises:
obtaining the information about the subscribed network slice of the UE from a unified data management entity.

20. The mobility management apparatus according to claim 15, wherein obtaining the identifier of the session management function entity corresponding to an established PDN connection comprises:
receiving the identifier of the session management function entity from a third mobility management entity.

* * * * *